United States Patent
Kubota

[11] Patent Number: 5,992,952
[45] Date of Patent: Nov. 30, 1999

[54] HYDRAULIC PRESSURE CONTROL APPARATUS HAVING DEVICE FOR ESTIMATING AMOUNT OF FLUID IN RESERVOIR TO WHICH THE FLUID IS DISCHARGED TO REDUCE CYLINDER PRESSURE

[75] Inventor: Kazuhiko Kubota, Toyota, Japan

[73] Assignee: Toyota Jidosha Kabushiki Kaisha, Toyota, Japan

[21] Appl. No.: 08/841,013

[22] Filed: Apr. 29, 1997

[30] Foreign Application Priority Data

Apr. 30, 1996 [JP] Japan ................................. 8-109032

[51] Int. Cl.$^6$ ................................................ B60T 8/00
[52] U.S. Cl. ............................................. 303/191; 303/10
[58] Field of Search ........................... 303/10, 11, 116.1, 303/116.2, 113.1, 166, 191; 188/181 R

[56] References Cited

U.S. PATENT DOCUMENTS

| | | | |
|---|---|---|---|
| 5,538,334 | 7/1996 | Kushi et al. | 303/113.5 |
| 5,558,414 | 9/1996 | Kubota . | |
| 5,641,209 | 6/1997 | Kushi et al. | 303/9.71 |
| 5,683,149 | 11/1997 | Arizawa et al. | 303/10 |

FOREIGN PATENT DOCUMENTS

| | | |
|---|---|---|
| 19533345 | 3/1996 | Germany . |
| 63-189776 U | 12/1988 | Japan . |
| 1119462A | 5/1989 | Japan . |
| 578462B2 | 10/1993 | Japan . |
| 7251727A | 10/1995 | Japan . |

*Primary Examiner*—Mark T. Le
*Assistant Examiner*—Melanie Talavera
*Attorney, Agent, or Firm*—Kenyon & Kenyon

[57] ABSTRACT

A hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir, the apparatus including a pressure control device which discharges the fluid from the brake cylinder, into the reservoir, to reduce a pressure of the fluid in the brake cylinder, and supplies the fluid pumped up from the reservoir, to the brake cylinder, to increase the pressure of the fluid in the brake cylinder, a reservoir fluid amount estimating device for estimating a cumulative amount of flow of the fluid from the brake cylinder into the reservoir and a cumulative amount of flow of the fluid out of the reservoir, and estimating an amount of the fluid stored in the reservoir on the basis of the estimated cumulative amount of flow of the fluid into the reservoir and the estimated cumulative amount of flow of the fluid out of the reservoir; and an estimated fluid amount changing device for changing the estimated reservoir fluid amount provided by the reservoir fluid amount estimating device, to a predetermined value, when an operating state of the hydraulic pressure control apparatus satisfies a predetermined condition during an operation of the pressure control device to control the pressure of the fluid in the brake cylinder.

15 Claims, 11 Drawing Sheets

FIG. 5
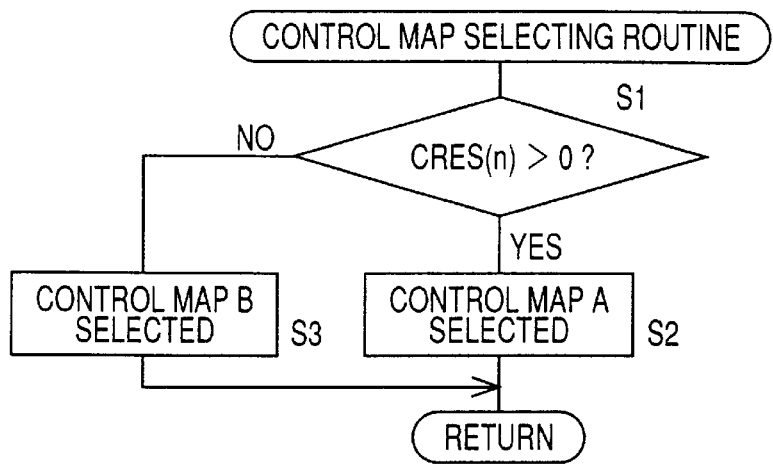
FIG. 6
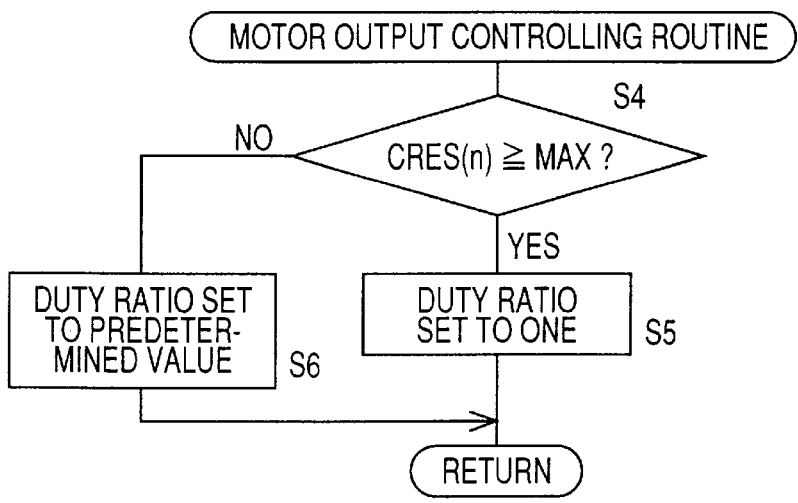
FIG. 7
FLOW-IN RATE Kx SELECTING MAP
VEHICLE DECELERATION $DV_{SO}$ ↓
| | FLOW-RATE DETERMINING FLAG SET | | FLOW-RATE DETERMINING FLAG RESET |
|---|---|---|---|
| | FRONT WHEEL 14 | REAR WHEEL 18 | REAR WHEEL 18 |
| | $K_{fr1}$ | $K_{rf1}$ | $K_{r1}$ |
| | $K_{fr2}$ | $K_{rf2}$ | $K_{r2}$ |
| | $K_{fr3}$ | $K_{rf3}$ | $K_{r3}$ |

HYDRAULIC PRESSURE CONTROL APPARATUS HAVING DEVICE FOR ESTIMATING AMOUNT OF FLUID IN RESERVOIR TO WHICH THE FLUID IS DISCHARGED TO REDUCE CYLINDER PRESSURE

BACKGROUND OF THE INVENTION

1. Field of the Invention

The present invention relates in general to a hydraulic pressure control apparatus or hydraulic braking apparatus of a motor vehicle, which is capable of controlling a pressure in a wheel brake cylinder of a hydraulically operated brake for braking a wheel of the vehicle. In particular, the present invention relates to such an apparatus which includes a device for estimating an amount of fluid stored in a reservoir to which the fluid is discharged to reduce the pressure in the brake cylinder.

2. Discussion of the Related Art

An example of a hydraulically operated braking apparatus of the type indicated above is disclosed in JP-A1-119462. This braking apparatus includes a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir, and the control apparatus includes (a) a pressure control device which discharges the fluid from the brake cylinder, into the reservoir, to reduce a pressure of the fluid in the brake cylinder, and supplies the fluid pumped up from the reservoir, to the brake cylinder, to increase the pressure of the fluid in the brake cylinder; and (b) reservoir fluid amount estimating means for estimating a cumulative amount of flow of the fluid from the brake cylinder into the reservoir and a cumulative amount of flow of the fluid out of the reservoir, and estimating an amount of the fluid stored in the reservoir on the basis of the estimated cumulative amount of flow of the fluid into the reservoir and the estimated cumulative amount of flow of the fluid out of the reservoir.

In the prior control apparatus, the reservoir fluid amount estimating means estimates the cumulative amount of flow of the fluid into the reservoir based on a pressure reducing time during which the pressure in the brake cylinder is reduced by the pressure control device, and estimates the cumulative amount of flow of the fluid out of the reservoir based on a pumping-up time during which the fluid is pumped up from the reservoir by the pump.

Once the reservoir fluid amount estimating means starts its operation, it continues to estimate the amount of the fluid stored in the reservoir (hereinafter referred to as the "reservoir fluid amount") until a continuous pressure control operation is finished by the pressure control device. However, as the estimating operation continues, the estimated reservoir fluid amount may largely deviate from the actual reservoir fluid amount. In this case, the estimating operation should be stopped. In addition, there are some cases where it is desirable not to continue the estimation though the estimated reservoir fluid amount value is not different from the actual value. For example, in the case where the prior control apparatus includes a control means for performing a predetermined control operation when the estimated reservoir fluid amount value coincides with a predetermined value, there are some cases where it is desirable to operate the control means compulsorily by changing the current estimated reservoir fluid amount value to the predetermined value.

SUMMARY OF THE INVENTION

It is an object of the present invention to provide a hydraulic pressure control apparatus which is capable of monitoring an operating state thereof.

The above object may be achieved according to a first aspect of this invention, which provides a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir, the apparatus comprising; a pressure control device which discharges the fluid from the brake cylinder, into the reservoir, to reduce a pressure of the fluid in the brake cylinder, and supplies the fluid pumped up from the reservoir, to the brake cylinder, to increase the pressure of the fluid in the brake cylinder; reservoir fluid amount estimating means for estimating a cumulative amount of flow of the fluid from the brake cylinder into the reservoir and a cumulative amount of flow of the fluid out of the reservoir, and estimating an amount of the fluid stored in the reservoir on the basis of the estimated cumulative amount of flow of the fluid into the reservoir and the estimated cumulative amount of flow of the fluid out of the reservoir; and estimated fluid amount changing means for changing the estimated reservoir fluid amount provided by the reservoir fluid amount estimating means, to a predetermined value, when an operating state of the hydraulic pressure control apparatus satisfies a predetermined condition during an operation of the pressure control device to control the pressure of the fluid in the brake cylinder.

The operating state of the hydraulic pressure control apparatus may comprise an operating state of the pressure control device and/or an operating state of the reservoir fluid amount estimating means. The operating state of the pressure control device may comprise a braking-cylinder-pressure controlling state, and the operating state of the reservoir fluid amount estimating means may comprise a reservoir-fluid-amount estimating state.

The predetermined value to which the estimated reservoir fluid amount is changed may comprise a fixed value which is determined in advance, or a variable value (or calculated value) which is determined, as needed, according to, e.g., a predetermined rule. The predetermined value may be selected from various values depending upon various purposes. For example, the predetermined value may be selected from a reservoir-capacity relating value which relates to the capacity or volume of the reservoir; a pressure-controlling-state relating value which relates to the pressure controlling state of the pressure control device which results from the actual reservoir fluid amount (e.g., short or excessive amount); and a highly possible value which is highly expected to be the actual reservoir fluid amount (e.g., value which is obtained on the assumption that a normal pressure control operation is performed by the pressure control device). The reservoir-capacity relating value may comprise a capacity value corresponding to the capacity of the reservoir (i.e., value indicating that the reservoir is full of the fluid); a half-capacity value corresponding to half the capacity of the reservoir (i.e., value indicating that an average amount of fluid is stored in the reservoir), etc. The pressure-controlling-state relating value may comprise a first value indicating that the reservoir runs short of the fluid; a second value indicating that an excessive amount of the fluid is stored in the reservoir, etc. The first value may comprise zero indicating that no fluid is present in the reservoir; and an excessively small value (greater than zero) indicating that an excessively small amount of the fluid is present in the reservoir. The second value may comprise the capacity value indicating that the reservoir is full of the fluid; and an excessively great value (smaller than the capacity value) indicating that an excessively large amount of the fluid is present in the reservoir. The highly possible value may comprise an average amount of the fluid being stored in the reservoir during a single continuous pressure control operation which usually includes a plurality of pressure reducing control operations and/or a plurality of pressure increasing control operations; the estimated reservoir fluid amount value which had been changed to the predetermined value; a highly expected value which is highly expected to be the actual reservoir fluid amount when the estimated value is changed thereto on the assumption that a normal pressure control operation is performed by the pressure control device from the commencement of the pressure control operation, etc. The above-indicated fixed value may comprise the reservoir-capacity relating value, the pressure-controlling-state relating value, and the average reservoir fluid amount value as the highly possible value. The above-indicated variable value may comprise the changed estimated reservoir fluid amount value and the highly expected value each as the highly possible value.

In the hydraulic pressure control apparatus constructed according to this first aspect of the present invention, the estimated reservoir fluid amount value is not changed to the predetermined value unless the operating state of the hydraulic pressure control apparatus satisfies the predetermined condition. On the other hand, if the operating state of the control apparatus satisfies the predetermined condition, the estimated value is changed to the predetermined value, whether or not the estimated value may be different from the actual reservoir fluid amount. The predetermined condition may be satisfied when the reservoir fluid amount estimating operation should not be continued or when it is desirable not to continue the estimating operation. The present control apparatus monitors the operating state thereof during the reservoir fluid amount estimating operation of the reservoir fluid amount estimating means, that is, during the brake-cylinder pressure controlling operation of the pressure control device, and changes the estimated reservoir fluid amount to the predetermined value, when appropriate.

According to a preferred feature of the first aspect of the invention, the estimated fluid amount changing means comprises pressure-control dependent changing means for changing the estimated reservoir fluid amount to the predetermined value when an operating state of the pressure control device to control the pressure of the fluid in the brake cylinder satisfies the predetermined condition. Even if the estimated reservoir fluid amount value itself is monitored, it is impossible to judge whether the estimated value is different from the actual value. Accordingly, the present control apparatus monitors the estimated value by monitoring the operating state of the pressure control device. That is, the present control apparatus indirectly monitors the estimated value by identifying an event which results from the cause that the estimated value is different from the actual value.

According to another feature of the first aspect of the invention, the estimated fluid amount changing means comprises means for changing the estimated reservoir fluid amount to a minimum value as the predetermined value, when the operating state of the hydraulic pressure control apparatus satisfies the predetermined condition that the pressure control device has continuously operated to increase the pressure of the fluid in the brake cylinder for not less than a reference time. This condition is satisfied if a single pressure-increase control operation continues for not less than the reference time, but may not be satisfied even if a plurality of pressure-increase control operations continue in total for not less than the reference time. However, a single pressure-increase control operation may comprise not only a pressure-increase control operation in which the pressurized fluid is continuously supplied to the brake cylinder but also a slow-pressure-increase control operation in which a pressure-increase control and a pressure-hold control are alternately performed. The reference time may be a time during which a normal pressure-increase control operation never continues. The minimum value may be a value (e.g., zero) which indicates that the fluid stored in the reservoir is not enough to be pumped up by the pump. The satisfaction of the predetermined condition indicates that the estimated reservoir fluid amount is largely deviated from the actual amount and therefore that the estimation of the reservoir fluid amount should be inhibited. In this case, the present control apparatus changes the estimated reservoir fluid amount value to the predetermined value which is nearer to the actual value. More specifically described, in the case where the estimated reservoir fluid amount is greater than the actual amount, the reservoir may, in fact, run short of the fluid though the estimated value does not indicate such situation. When the reservoir runs short of the fluid, the fluid is not supplied to the brake cylinder and accordingly the pressure in the brake cylinder is not increased, even if a pressure-increase control operation is performed. Thus, a pressure-reduce or pressure-hold control starting condition may not be satisfied, and the pressure-increase control operation may continue for not less than the reference time. In other words, if the single pressure-increase control operation continues for not less than the reference time, it can be estimated that the reservoir is short of the fluid. In this case, the estimated reservoir fluid amount value is changed to the minimum value which is nearer or closer to the actual value than the estimated value. Thus, the present control apparatus can easily adjust the estimated value to an appropriate value without having to improve the accuracy of estimation of the reservoir fluid amount.

According to another feature of the first aspect of the invention, the estimated fluid amount changing means comprises means for changing the estimated reservoir fluid amount to a maximum value as the predetermined value, when the operating state of the hydraulic pressure control apparatus satisfies the predetermined condition comprising at least one of a first condition that the pressure control device has continuously operated to reduce the pressure of the fluid in the brake cylinder for not less than a first reference time and a second condition that a slipping state of the wheel in which a slip of the wheel is higher than a reference value has continued for not less than a second reference time. This first condition is satisfied if a single pressure-reduce control operation continues for not less than the first reference time, but may not be satisfied even if a plurality of pressure-reduce control operations continue in total for not less than the first reference time. However, a single pressure-reduce control operation may comprise not only a pressure-reduce control operation in which the pressurized fluid is continuously discharged from the brake cylinder but also a slow-pressure-reduce control operation in which a pressure-reduce control and a pressure-hold control are alternately performed. The first reference time may be a time during which a normal pressure-reduce control operation never continues. The maximum value may be a value (e.g., capacity value of the reservoir) which indicates that the reservoir cannot store any more fluid. The second condition may be satisfied if the slipping state of the wheel in which a slip ratio or a slip amount of the wheel is higher than a reference value continues for not less than the second reference time. The satisfaction of the first or second condition indicates that the reservoir is full of the fluid and therefore that the fluid cannot be appropriately discharged from the brake cylinder. In this case, the present control apparatus changes the estimated reservoir fluid amount value to the maximum value which is closer to the actual value. More specifically described, in the case where the estimated reservoir fluid amount is smaller than the actual amount, the reservoir may, in fact, be full of the fluid though the estimated value does not indicate such situation. When the reservoir is full of the fluid, the fluid is not discharged from the brake cylinder and accordingly the pressure in the brake cylinder is not reduced, even if a pressure-reduce control operation is performed. Thus, a pressure-increase or pressure-hold control starting condition may not be satisfied, and the pressure-reduce control operation may continue for not less than the first reference time. In other words, if the single pressure-reduce control operation continues for not less than the first reference time, it can be estimated that the reservoir is full of the fluid. In this case, the estimated reservoir fluid amount value is changed to the maximum value which is closer to the actual value than the estimated value.

According to another feature of the first aspect of the invention, the brake further includes an electric motor which drives the pump, the hydraulic pressure control apparatus further comprises a motor output control device which controls an output of the electric motor, and the motor output control device comprises means for maximizing the output of the electric motor when the reservoir fluid amount estimating means provides the maximum value as the estimated reservoir fluid amount. In this case, if the estimated reservoir fluid amount becomes equal to the maximum value, the fluid is quickly pumped up from the reservoir by the pump. Consequently the pressure in the brake cylinder is appropriately reduced. The motor-output control device may comprise a duty-ratio control device which controls an electric current supplied to the motor, at a variable duty ratio. In the latter case, the output of the motor may be maximized by maximizing the duty ratio.

According to another feature of the first aspect of the invention, the estimated fluid amount changing means comprises fluid-amount-estimation dependent changing means for changing the estimated reservoir fluid amount to the predetermined value when an operating state of the reservoir fluid amount estimating means to estimate the amount of the fluid stored in the reservoir satisfies the predetermined condition. In the case where the estimated reservoir fluid amount differs from the actual amount because an abnormality occurs to the present control apparatus, it is possible to identify whether or not the estimated value is reliable, by monitoring the estimated value itself or the amount of change of the estimated values per unit time. In this case, the predetermined condition may be that an estimated-reservoir-fluid-amount relating value which relates to the estimated reservoir fluid amount does not fall within a reference range. The estimated-reservoir-fluid-amount relating value may be the estimated value itself or the amount of change of the estimated values per unit time, as indicated above. In this case, the predetermined value may be zero, or the capacity value of the reservoir, or alternatively may be a highly possible value such as an average of zero and the reservoir capacity, i.e., half the reservoir capacity. The predetermined condition may be that an abnormality has been detected from at least one of the respective operating states of the pressure control device and the reservoir fluid amount estimating means. In the latter case, since the abnormality may occur to the electric system of the control apparatus, the control apparatus may comprise a detecting device for detecting the abnormality, a detecting device for detecting noise contained in the electric current supplied to the pressure control device and/or the estimating means, or a detecting device for detecting a temporary power failure from the control apparatus. When the abnormality, noise, or power failure is detected, the estimated reservoir fluid amount is changed to a highly possible value as the predetermined value. More specifically described, if an abnormality occurs to the pressure control device and/or the estimating means, the estimating means cannot accurately estimate the reservoir fluid amount, so that the estimated value may go below zero, go beyond the capacity of the reservoir, or the amount of change of the estimated values per unit time may become an excessively great value. Therefore, if the estimated value becomes negative or exceeds the reservoir capacity by more than a reference value, or if the amount of change of the estimated values exceeds a reference change amount, the present control apparatus may change the estimated value to one of zero, the excessively small value, the reservoir capacity, the excessively great value, half the capacity, the average value, the "changed" estimated value, the highly expected value, etc., depending upon the estimated cause of the abnormality. The unit time employed for calculating the amount of change of the estimated values may be a formal unit time such as millisecond, or alternatively may be a predetermined time such as a cyclic period at which the estimating means cyclically or periodically estimates the reservoir fluid amount.

According to another feature of the first aspect of the invention, the estimated fluid amount changing means comprises means for changing the estimated reservoir fluid amount to the predetermined value when the operating state of the hydraulic pressure control apparatus satisfies the predetermined condition that an estimated-reservoir-fluid-amount relating value which relates to the estimated reservoir fluid amount does not fall within a reference range. Meanwhile, the estimated-reservoir-fluid-amount relating value indicates the operating state of the reservoir fluid amount estimating means. Therefore, if the estimated-reservoir-fluid-amount relating value does not fall within the reference range, it can be said that the operating state of the reservoir fluid amount estimating means satisfies the predetermined condition.

According to another feature of the first aspect of the invention, the hydraulic pressure control apparatus further comprises a fluid supplying device which supplies the fluid to the reservoir; and a fluid-supplying-device control device which controls the fluid supplying device to supply the fluid to the reservoir when the estimated reservoir fluid amount is not greater than a lower limit value. In the present case, when the estimated reservoir fluid amount is not greater than the lower limit value, the fluid is supplied to the reservoir. Thus, the reservoir is effectively prevented from running short of the fluid. The fluid supplying device may comprise a direct supply device which directly supplies the fluid from a fluid pool to the reservoir, or an indirect supply device which first supplies the fluid to the brake cylinder so that the fluid is discharged from the brake cylinder and supplies to the reservoir when the pressure in the brake cylinder is reduced. The fluid supplying device can be said as a previously-described control means for performing a redetermined specific control operation when the estimated reservoir fluid amount coincides with a reference value. Therefore, the present control apparatus can compulsorily operate the fluid supplying device by changing the estimated value to the predetermined value equal to the reference value. In other words, in the event that it is desirable to perform the above specific control operation, the present control apparatus has only to change the estimated value to the predetermined value. Thus, the control means or the fluid supplying device can be effectively utilized.

According to another feature of the first aspect of the invention, the brake includes a master cylinder and a fluid passage which communicates at one end thereof with the master cylinder and at the other end thereof with the brake cylinder, wherein the pressure control device comprises a connecting and disconnecting device which is provided midway in the fluid passage and which is selectively placed in a connecting state in which the connecting and disconnecting device connects the master cylinder and the brake cylinder and a disconnecting state in which the connecting and disconnecting device disconnects the master cylinder and the brake cylinder from each other; and a connecting-and-disconnecting-device control device which controls the connecting and disconnecting device to be placed from the disconnecting state thereof to the connecting state thereof when the estimated reservoir fluid amount is not greater than a lower limit value, and wherein the estimated fluid amount changing means comprises means for changing the estimated reservoir fluid amount to the predetermined value not greater than the lower limit value, when the operating state of the hydraulic pressure control apparatus satisfies the predetermined condition that after the operation of the pressure control device has started, a slipping state of the wheel in which a slip of the wheel is smaller than a reference value has continued for not less than a reference time. The "low or shallow" slipping state of the wheel in which the slip of the wheel is smaller than the reference value can be thought as indicating the insufficiency of the increasing of the brake cylinder pressure performed by the pressure control device. Accordingly, the "low or shallow" slipping state of the wheel can be regarded as an operating state of the present control apparatus. The lower limit value may be obtained by adding a predetermined positive value to the minimum value indicating that the reservoir does not have the fluid enough to be able to be pumped up by the pump, so that the connecting and disconnecting device may surely be placed in its connecting state before the fluid stored in the reservoir is reduced below the minimum value. In the latter case, therefore, if the minimum value is employed as the predetermined value, that object can surely be achieved. The slip of the wheel may be a slip ratio of the wheel or a slip amount of the same. As discussed previously, there are some cases where it is desirable not to continue the estimation of the reservoir fluid amount. Those cases comprise the above-indicated case where the "low or shallow" slipping state of the wheel in which the slip of the wheel is smaller than the reference value has continued for not less than the reference time. In the present control apparatus, when the estimated reservoir fluid amount is changed to the predetermined value not greater than the lower limit value, the connecting and disconnecting device to be placed from the disconnecting state thereof to the connecting state thereof, so that the brake cylinder pressure may be quickly increased. In this case, the changing of the estimated reservoir fluid amount is carried out not for correcting the estimated amount different from the actual value but for more effectively utilizing the connecting and disconnecting device and the connecting-and-disconnecting-device control device. Those two elements are employed mainly for preventing the reservoir from running short of the fluid enough to be pumped by the pump to increase the brake cylinder pressure. Accordingly, when the estimated reservoir fluid amount is not greater than the lower limit value, the connecting and disconnecting device is placed in its connecting state, so that the fluid may be supplied from the master cylinder to the brake cylinder. On the other hand, for example, in the case where the friction coefficient $\mu$ of the road surface on which the vehicle is running abruptly changes to be very high, it is desirable to increase quickly the brake cylinder pressure. In this case, however, the brake cylinder pressure may not be increased at a sufficiently high rate because the rate of delivery or output of the pump is not very high, though the fluid in the reservoir may be enough. This problem can be solved by conveniently changing the estimated reservoir fluid amount to the predetermined value not greater than the lower limit value so that the connecting and disconnecting device may be placed in its connecting state, the fluid may be supplied from the master cylinder to the brake cylinder, and the brake cylinder pressure may be increased at a raised rate. The connecting-and-disconnecting device control device can be said as a previously-described control means for performing a predetermined specific control operation when the estimated reservoir fluid amount coincides with a reference value. Therefore, the present control apparatus can compulsorily operate the control means by changing the estimated value to the predetermined value equal to the reference value. In other words, in the event that it is desirable to perform the above specific control operation, the present control apparatus has only to change the estimated value to the predetermined value.

According to another feature of the first aspect of the invention, the brake includes a master cylinder and a fluid passage which communicates at one end thereof with the master cylinder and at the other end thereof with the brake cylinder, wherein the pressure control device comprises a connecting and disconnecting device which is provided midway in the fluid passage and which is selectively placed in a connecting state in which the connecting and disconnecting device connects the master cylinder and the brake cylinder and a disconnecting state in which the connecting and disconnecting device disconnects the master cylinder and the brake cylinder from each other; and a connecting-and-disconnecting-device control device which controls the connecting and disconnecting device to be placed from the disconnecting state thereof to the connecting state thereof when the estimated reservoir fluid amount is not greater than a lower limit value, wherein the hydraulic pressure control apparatus further comprises a road-surface friction coefficient obtaining device which obtains, during an operation of the pressure control device, a friction coefficient, $\mu$, of a road surface on which the vehicle is running, and wherein the estimated fluid amount changing means comprises means for changing the estimated reservoir fluid amount to the predetermined value not greater than the lower limit value, when the operating state of the hydraulic pressure control apparatus satisfies the predetermined condition that the road-surface friction coefficient $\mu$ obtained by the road-surface friction coefficient obtaining device has increased by not less than a reference value. The road-surface friction coefficient obtaining device may comprise vehicle-deceleration-dependent obtaining means for determining the friction coefficient $\mu$ of the road surface based on a vehicle deceleration, or vehicle-behavior-dependent obtaining means for determining the friction coefficient $\mu$ of the road surface based on a special vehicle behavior. If the "shallow"

slipping state of the wheel in which the slip of the wheel is smaller than the reference value has continued for not less than the reference time, as indicated above, it is possible to judge that the friction coefficient $\mu$ has increased by not less than the reference value. Therefore, the vehicle-behavior-dependent obtaining means may comprise the above-described estimated fluid amount changing means comprising the means for changing the estimated reservoir fluid amount to the predetermined value not greater than the lower limit value, when the operating state of the hydraulic pressure control apparatus satisfies the predetermined condition that after the operation of the pressure control device has started, the "shallow" slipping state of the wheel has continued for not less than the reference time.

According to another feature of the first aspect of the invention, the brake includes a master cylinder and a reservoir fluid passage which communicates at one end thereof with the master cylinder and at the other end thereof with the reservoir, wherein the hydraulic pressure control apparatus further comprises a connecting and disconnecting device which is provided midway in the reservoir fluid passage and which is selectively placed in a connecting state in which the connecting and disconnecting device connects the master cylinder and the reservoir and a disconnecting state in which the connecting and disconnecting device disconnects the master cylinder and the reservoir from each other; and a connecting-and-disconnecting-device control device which controls the connecting and disconnecting device to be placed from the disconnecting state thereof to the connecting state thereof when the estimated reservoir fluid amount is not greater than a lower limit value. The master cylinder, the reservoir fluid passage, the connecting and disconnecting device, etc. cooperate with one another to provide the above-indicated direct fluid supply device. The present hydraulic pressure control apparatus which includes the connecting and disconnecting device can be used as a traction pressure control apparatus.

According to another feature of the first aspect of the invention, the pressure control device comprises a pressure reducing control device which reduces the pressure of the fluid in the brake cylinder by discharging the fluid from the brake cylinder, and a pressure increasing control device which increases the pressure of the fluid in the brake cylinder by supplying the fluid pumped up from the reservoir, to the brake cylinder.

According to another feature of the first aspect of the invention, the pressure control device comprises at least one of an anti-lock pressure control device which controls the pressure of the fluid in the brake cylinder such that a slipping state of the wheel on a road surface upon the activation of the brake cylinder is maintained at a first optimum state, and a traction pressure control device which controls the pressure of the fluid in the brake cylinder such that a slipping state of the wheel being driven on a road surface is maintained at a second optimum value.

According to another feature of the first aspect of the invention, the reservoir fluid amount estimating means comprises flow-in amount estimating means for estimating the cumulative amount of flow of the fluid into the reservoir on the basis of a pressure reducing time during which the pressure of the fluid in the brake cylinder is reduced by the pressure control device, and flow-out amount estimating means for estimating the cumulative amount of flow of the fluid out of the reservoir on the basis of a pumping time during which the pump pumps up the fluid from the reservoir.

According to another feature of the first aspect of the invention, the hydraulic pressure control apparatus further comprises a deceleration obtaining device which obtains a deceleration of the vehicle on which the hydraulic pressure control apparatus is mounted, wherein the reservoir fluid amount estimating means comprises deceleration dependent estimating means for estimating the amount of the fluid stored in the reservoir on the basis of the vehicle deceleration obtained by the deceleration obtaining device. Although the reservoir fluid amount can be estimated based on the time of reducing of the brake cylinder pressure and the time of pumping up of the pump, the accuracy of estimation of the reservoir fluid amount can be improved by additionally taking the vehicle deceleration into account.

According to a second aspect of the present invention, there is provided a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir, the apparatus comprising a pressure control device which discharges the fluid from the brake cylinder into the reservoir to reduce a pressure of the fluid in the brake cylinder, and supplies the fluid pumped up from the reservoir, to the brake cylinder, to increase the pressure of the fluid in the brake cylinder; reservoir fluid amount estimating means for estimating a cumulative amount of flow of the fluid from the brake cylinder into the reservoir and a cumulative amount of flow of the fluid out of the reservoir, and estimating an amount of the fluid stored in the reservoir on the basis of the estimated cumulative amount of flow of the fluid into the reservoir and the estimated cumulative amount of flow of the fluid out of the reservoir; and monitor means for judging whether each of the estimated reservoir fluid amount values provided by the reservoir fluid amount estimating means, is appropriate, during an operation of the reservoir fluid amount estimating means.

In the control apparatus in accordance with the second aspect of the invention, the monitor means may make a positive judgment that each estimated reservoir fluid amount value is appropriate, not only if the estimated value is close to the actual value but also if the estimated value is equal to the predetermined value equal to the reference value at which the above-indicated control means performs its special control operation, whether or not the estimated value is different from the actual value. In other words, the monitor means may perform a first monitoring operation to judge whether the estimated value is different from to the actual value, or a second monitoring operation to judge whether the estimated value is desirable for, e.g., the connecting-and-disconnecting-device control device to control the connecting and disconnecting device as described previously. For example, if the estimated value is not greater than the lower limit value, the monitor means may make a positive judgment but, if the estimated value is greater than the lower limit value, the monitor means may make a negative judgment. Generally, it is very difficult to judge whether each of the estimated reservoir fluid amount values is appropriate, by just monitoring the estimated values themselves. Accordingly, it is very convenient to judge first whether the operating state of the pressure control device has satisfied the predetermined condition and indirectly judge whether each estimated value is appropriate based on that first judgment. Meanwhile, if an abnormality occurs to the present control apparatus, the reservoir estimating means may provide an excessively great estimated reservoir fluid amount value. In the latter case, it is possible to judge whether each estimated value is appropriate, by monitoring directly the estimated value itself or the previously-described estimated-value relating value. Thus, the monitor means may comprise direct monitor means for monitoring directly the estimated values, or indirect monitor means for monitoring indirectly the estimated values by monitoring, e.g., the operating state of the pressure control device.

According to a third aspect of the present invention, there is provided a hydraulic pressure control apparatus for a brake including a master cylinder, a brake cylinder activated by a pressurized fluid for braking a wheel of a vehicle, a fluid passage which communicates at one end thereof to the master cylinder and at the other end thereof to the brake cylinder, a reservoir for storing the fluid discharged from the brake cylinder, and a pump for pumping up the fluid from the reservoir, the apparatus comprising a pressure reducing control device which discharges the fluid from the brake cylinder into the reservoir to reduce a pressure of the fluid in the brake cylinder; a pressure increasing control device which supplies the fluid pumped up from the reservoir, to the brake cylinder, to increase the pressure of the fluid in the brake cylinder; a connecting and disconnecting device which is provided midway in the fluid passage and which is selectively placed in a connecting state in which the connecting and disconnecting device connects the master cylinder and the brake cylinder and a disconnecting state in which the connecting and disconnecting device disconnects the master cylinder and the brake cylinder from each other; and a connecting-and-disconnecting-device control device which controls the connecting and disconnecting device to be placed from the disconnecting state thereof to the connecting state thereof when a rotating state of the wheel satisfies a predetermined condition.

In the control apparatus in accordance with the third aspect of the invention, the predetermined condition may be that after the operation of the pressure reducing or increasing control device has started, a slipping state of the wheel in which a slip of the wheel is smaller than a reference value has continued for not less than a reference time. The slip of the wheel may be a slip ratio or amount of the wheel.

BRIEF DESCRIPTION OF THE DRAWINGS

The above and optional objects, features, advantages and technical significance of the present invention will be better understood by reading the following detailed description of presently preferred embodiments of the invention, when considered in conjunction with the accompanying drawings, in which:

FIG. 5 is a flow chart representing a control map selecting routine stored in the ROM of the controller of the control apparatus of FIG. 1;

FIG. 6 is a flow chart representing a motor-output controlling routine stored in the ROM of the controller of the control apparatus of FIG. 1;

FIG. 7 is a view of a flow-in rate selecting map stored in the ROM of the controller of the control apparatus of FIG. 1;

DETAILED DESCRIPTION OF THE PREFERRED EMBODIMENTS

Figure 1:
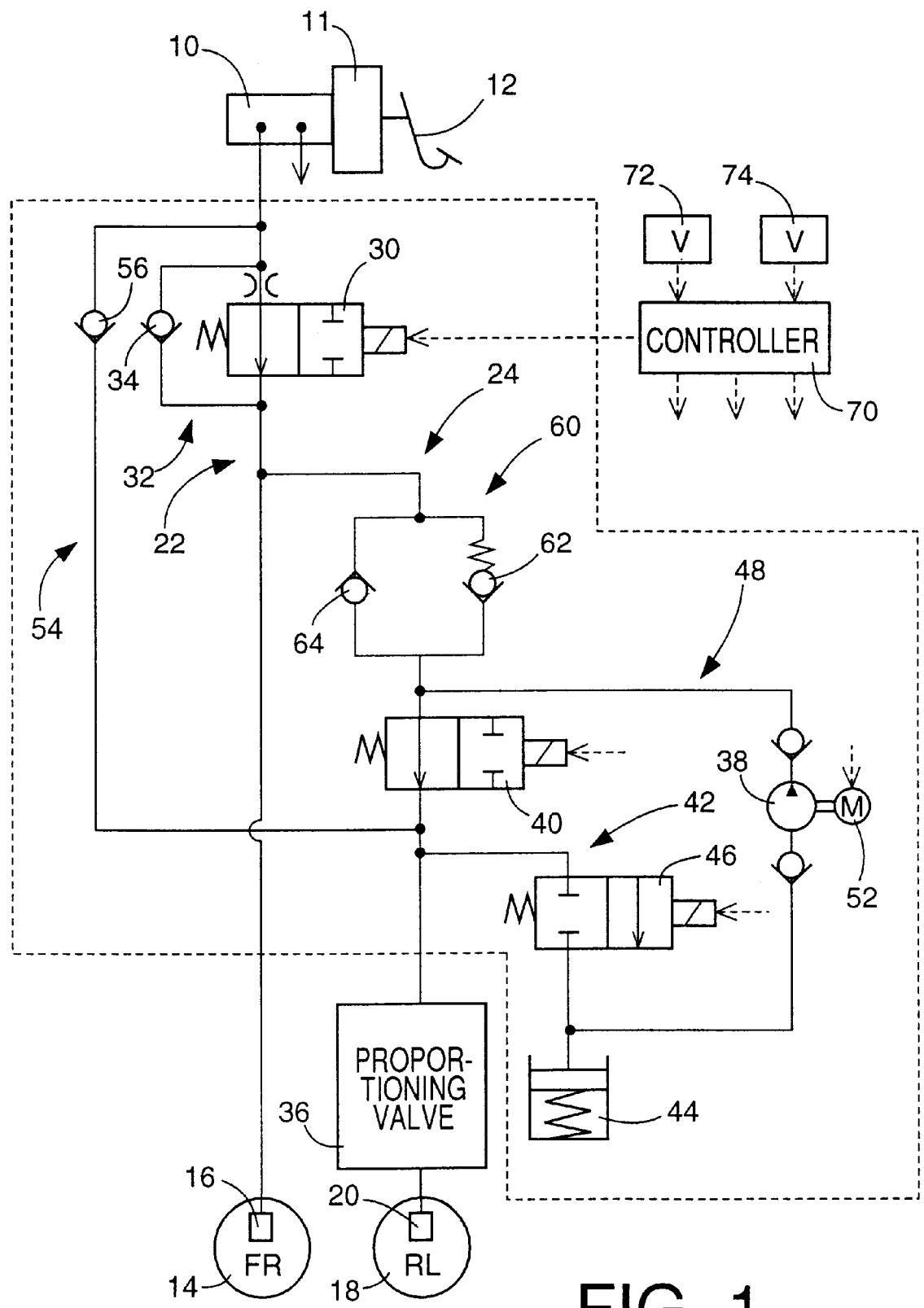
FIG. 1 is a schematic view illustrating an anti-lock braking system including a hydraulic pressure control apparatus constructed according to one embodiment of this invention.

Referring first to FIG. 1, there is shown an anti-lock braking system of diagonal or X-crossing type for a motor vehicle. In the figure, reference numeral 10 denotes a master cylinder which functions as a hydraulic pressure source. The master cylinder 10 is of a tandem type in which two mutually independent fluid pressurizing chambers are disposed in series. The master cylinder 10 is linked with a brake operating member in the form of a brake pedal 12 through a booster 11. Upon operation or depression of the brake pedal 12 by the driver or operator of the motor vehicle, equal pressures of a working brake fluid are mechanically generated in the two pressurizing chambers of the master cylinder 10.

One of the two pressurizing chambers of the master cylinder 10 is connected to brake cylinders 16, 20 of hydraulically operated brakes for a front right wheel 14 and a rear left wheel 18 of the vehicle, while the other pressurizing chamber is connected to brake cylinders (not shown) of hydraulically operated brakes for a front left wheel and a rear right wheel (not shown) of the vehicle. These brake cylinders are hereinafter referred to as "wheel brake cylinders". Thus, the braking system has two mutually independent pressure application sub-systems, one of which has the front right wheel brake cylinder 16 and the rear left wheel brake cylinder 20, and the other of which has the front left wheel brake cylinder and the rear right wheel brake cylinder. Since the two pressure application sub-systems are identical in construction with each other, only one of these two sub-systems is illustrated in FIG. 1 and will be hereinafter described.

In each pressure application sub-system, the corresponding pressurizing chamber of the master cylinder 10 is connected to the front wheel brake cylinder 16 through a front brake cylinder passage (primary fluid passage) 22. A rear brake cylinder passage (secondary fluid passage) 24 is connected at one end thereof to the front wheel brake cylinder passage 22 and at the other end to the rear wheel brake cylinder 20.

A normally-open first solenoid-operated shut-off valve in the form of a cut-off valve 30 is disposed in a portion of the front brake cylinder passage 22 between the master cylinder 10 and a point of connection of the front and rear wheel brake cylinder passages 22, 24. Further, a by-pass return passage 32 is provided in parallel with the first shut-off valve 30, so as to by-pass the cut-off valve 30. The by-pass return passage 32 is provided with a check valve 34, which inhibits a flow of the brake fluid in a first direction from the master cylinder 10 toward the front wheel brake cylinder 16, and permits a flow of the brake fluid in a second direction opposite to the first direction. Namely, the brake fluid is permitted to flow through the check valve 34 in the second direction when the pressure downstream of the cut-off valve 30 (on the side of the front wheel brake cylinder 16) is higher than the pressure upstream of the cut-off valve 30 (on the side of the master cylinder 10), by more than a predetermined difference (hereinafter referred to as "valve opening pressure difference"). However, this valve opening pressure difference of the check valve 34 is substantially zero. The by-pass return passage 32 and check valve 34 are provided to return the fluid from the front wheel brake cylinder 16 to the master cylinder 10 when the depressed brake pedal 12 is moved toward the fully retracted position.

Described in detail, the by-pass return passage 32 and check valve 34 have not only a function of rapidly returning the fluid from the front wheel brake cylinder 16 to the master cylinder 10 upon releasing of the brake pedal 12 during a normal braking operation (not in an anti-lock control fashion), but also a function of returning the fluid from the front wheel brake cylinder 16 to the master cylinder upon releasing of the brake pedal 12 when a controller 70 of the braking system is placed in an anti-lock pressure control mode wherein the fluid pressures in the front and rear wheel brake cylinders 16, 20 are automatically controlled so as to avoid excessive amounts of slip of the front and rear wheels 14, 18. In the present embodiment, the cut-off valve 30 is usually held closed throughout an anti-lock pressure control operation, and the fluid cannot be returned from the front wheel brake cylinder 16 to the master cylinder 10 through the cut-off valve 30 in the anti-lock pressure control operation, as described below. To return the fluid from the front wheel brake cylinder 16 to the master cylinder 10 in the anti-lock pressure control mode, the by-pass return passage 32 and the check valve 34 are provided in the present embodiment.

A proportioning valve or P valve 36 is provided in the rear brake cylinder passage 24. This proportioning valve 36 (hereinafter referred to as "P valve 36") is constructed as well known in the art, and a detailed description of the P valve 36 is deemed unnecessary. Briefly described, the P valve 36 functions such that its output pressure to be applied to the rear wheel brake cylinder 20 is equal to its input pressure when the input pressure is not higher than a predetermined critical point, while its output pressure is lowered at a predetermined ratio with respect to its input pressure when the input pressure is higher than the critical point, in order to avoid locking of the rear wheel 18 due to an excessive pressure in the rear wheel brake cylinder 20.

During a normal braking operation, the P valve 36 receives the pressurized fluid from the master cylinder 10. During an anti-lock pressure control operation, however, the P valve 36 receives the pressurized fluid delivered from a pump 38. In the former case, the input pressure of the P valve 36 is equal to the pressure in the master cylinder 10 (hereinafter referred to as "master cylinder pressure"). In the latter case, the input pressure is equal to the delivery pressure of the pump 38.

As shown in FIG. 1, a normally-open second solenoid-operated shut-off valve in the form of a pressure increasing and reducing valve 40 is disposed in a portion of the rear brake cylinder passage 24 between the P valve 36 and the point of connection of the front and rear brake cylinder passages 22, 24. A pressure reducing passage in the form of a reservoir passage 42 is connected at one end thereof to a portion of the rear brake cylinder passage 24 between the P valve 36 and the pressure increasing and reducing valve 40, and at the other end to a reservoir 44. A normally-closed third solenoid-operated shut-off valve in the form of a pressure reducing valve 46 is provided in the reservoir passage 42.

A pressure increasing passage in the form of a pump passage 48 is connected at one end thereof to the reservoir 44 and at the other end to the rear brake cylinder passage 24. The pump 38 indicated above is provided in the pump passage 48, for pressurizing the brake fluid pumped up from the reservoir 44 and delivering the pressurized fluid to the front and rear wheel brake cylinders 16, 20. The pump 38 is driven by a motor 52. The delivery or output port of the pump 38 is connected to a portion of the rear brake cylinder passage 24 between the pressure increasing and reducing valve 40 and the point of connection to the front brake cylinder passage 22.

The pump 38 is of a plunger type driven by the motor 52 such that the rate of delivery of the pump 38 increases substantially in proportion to the rotating speed of the motor 52, which in turn increases with an electric current supplied to the motor 52. Accordingly, the delivery rate of the pump 38 can be estimated on the basis of the electric current supplied to the motor 52. In the present embodiment, the electric voltage supplied to the motor 52 is maintained constant and, when an estimated amount of the fluid stored in the reservoir 44 (hereinafter, referred to as an "estimated reservoir fluid amount") is not less than a capacity of the reservoir 44 as a maximum value, a maximum electric current is supplied to the motor 52, as will be described later.

A return passage 54 is connected at one end thereof to a portion of the rear brake cylinder passage 24 between the P valve 36 and the pressure increasing and reducing valve 40, and at the other end to a portion of the front brake cylinder passage 22 between the master cylinder 10 and the cut-off valve 30. A check valve 56 is provided in the return passage 54. This check valve 56 inhibits a flow of the working fluid in a direction from the master cylinder 10 toward the rear wheel brake cylinder 20, and permits a flow of the brake fluid in the reverse direction with its valve opening pressure difference being substantially zero. Like the by-pass return passage 32 and check valve 34, the return passage 54 and check valve 56 are provided to rapidly return the fluid from the rear wheel brake cylinder 20 to the master cylinder 10.

A pressure reducing valve device 60 is disposed in a portion of the rear brake cylinder passage 24 between the point of connection of the rear brake cylinder passage 24 and the pump passage 48 and the point of connection of the front and rear brake cylinder passages 22, 24. This pressure reducing valve device 60 includes a first check valve 62 whose opening pressure difference is not substantially zero, and a second check valve 64 whose opening pressure difference is substantially zero. The first and second check valves 62, 64 are disposed in parallel with each other and have opposite directions in which the brake fluid is permitted to flow. The first check valve 62 is so oriented as to inhibit a flow of the fluid in a direction from the front wheel brake cylinder 16 toward the pressure increasing and reducing valve 40, and permit a flow of the fluid in the reverse direction when the pressure of the fluid delivered from the pump 38 is higher than the pressure in the front wheel brake cylinder 16 by more than a preset or predetermined opening pressure difference of the check valve 62. The second check valve 64 is so oriented as to permit a flow of the fluid in a direction from the front wheel brake cylinder 16 toward the pressure increasing and reducing valve 40 when the pressure of the fluid in the front wheel brake cylinder 16 is higher than the pressure of the fluid delivered from the pump 38, and inhibit a flow of the fluid in the reverse direction.

Next, there will be described flows of the brake fluid to and from the master cylinder 10, pump 38, and pressure reducing valve device 60, and front and rear wheel brake cylinders 26, 20.

During a normal operation of the present braking system upon depression of the brake pedal 12 without an operation of the pump 38, the working fluid pressurized by the master cylinder 10 is supplied to the front wheel brake cylinder 16 through the first shut-off valve or cut-off valve 30, and to the rear wheel brake cylinder 20 through the cut-off valve 30 and the second check valve 64 of the pressure reducing valve device 60. Since the opening pressure difference of the second check valve 64 is substantially zero, almost the same braking pressures are applied to the front and rear wheel brake cylinders 16, 20.

When the depressed brake pedal 12 is released, the fluid in the front wheel brake cylinder 16 is returned to the master cylinder 10 through the check valve 34, while the fluid in the rear wheel brake cylinder 20 is returned to the master cylinder 10 through the check valve 56.

When an anti-lock pressure control operation is initiated, the pump 38 is operated. When the cut-off valve 30 is closed, the fluid delivered from the pump 38 is supplied to the rear wheel brake cylinder 20 without flowing through the first check valve 62, and is supplied to the front wheel brake cylinder 16 through the first check valve 62. Since the opening pressure difference of the first check valve 62 is not substantially zero, the braking pressure in the front wheel brake cylinder 16 is made lower than that in the rear wheel brake cylinder 20 by an amount corresponding to the preset opening pressure difference of the first check valve 62.

Thus, the master cylinder 10 serves as the hydraulic pressure source during the normal operation of the braking system without an operation of the pump 38, and substantially the same braking pressures are applied to the front and rear wheel brake cylinders 16, 20, whereby substantially same braking forces act on the front and rear wheels 14, 18. During the anti-lock pressure control operation, on the other hand, the pump 38 serves as the hydraulic pressure source source, and the braking pressures to be applied to the front and rear wheel brake cylinders 16, 20 are regulated such that the braking pressure in the front wheel brake cylinder 16 is lower than that in the rear wheel brake cylinder 20 by an amount corresponding to the predetermined opening pressure difference of the first check valve 62, whereby the braking force acting on the rear wheel 18 is accordingly greater than that acting on the front wheel 14.

The mechanical components of the braking system described above, which are within a broken-line block in FIG. 1, constitute a unit installed on a front part of the motor vehicle. As a result, the portion of the secondary fluid passage or rear brake cylinder passage 24 which is between the pressure increasing and reducing valve 40 within the unit and the P valve 36 outside the unit is comparatively long and has a comparatively great resistance to the flows of the fluid therethrough. Accordingly, the fluid discharged from the front wheel brake cylinder 16 during the anti-lock pressure control operation is unlikely to be introduced into the rear wheel brake cylinder 20 through the rear brake cylinder passage 24.

The present braking system is controlled by the controller 70 indicated above. The controller 70 is principally constituted by a computer and analog-to-digital (A/D) converters. The computer incorporates a central processing unit (CPU), a read-only memory (ROM), a random-access memory (RAM) and a bus. The controller 70 has an input interface adapted to receive output signals of wheel speed sensors 72, 74 for detecting the rotating speeds of the front right wheel 14 and rear left wheel 18, respectively, and wheel speed sensors for detecting the rotating speeds of the front left wheel and rear right wheel (not shown). The controller 70 also has an output interface to which there are connected through respective drivers (not shown) the solenoid coils of the first, second and third shut-off valves 30, 40, 46 and the motor 52.

Figure 2:
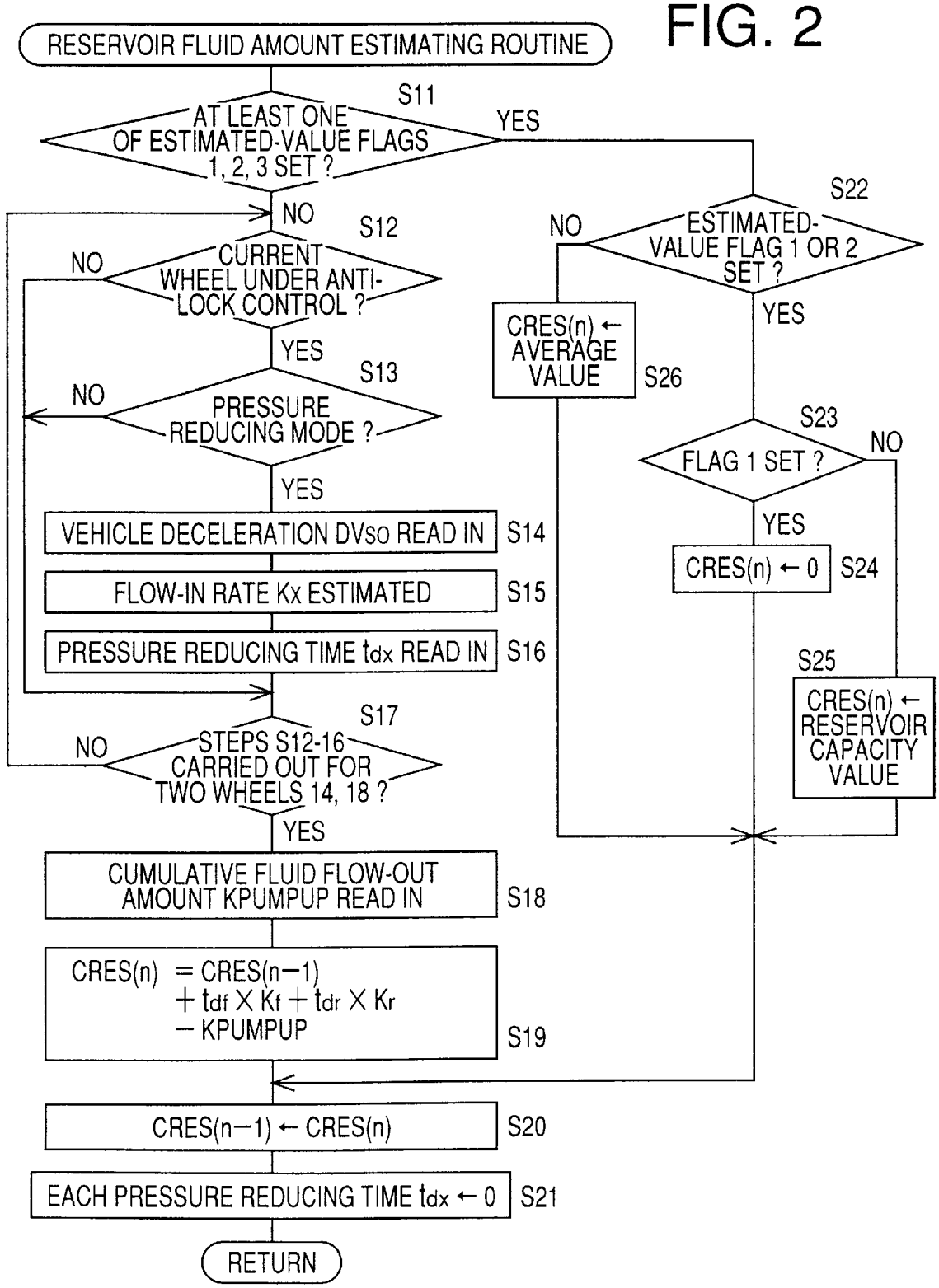
FIG. 2 is a flow chart representing a reservoir fluid amount estimating routine stored in a read only memory (ROM) of a controller of the control apparatus of FIG. 1.
Figure 3:
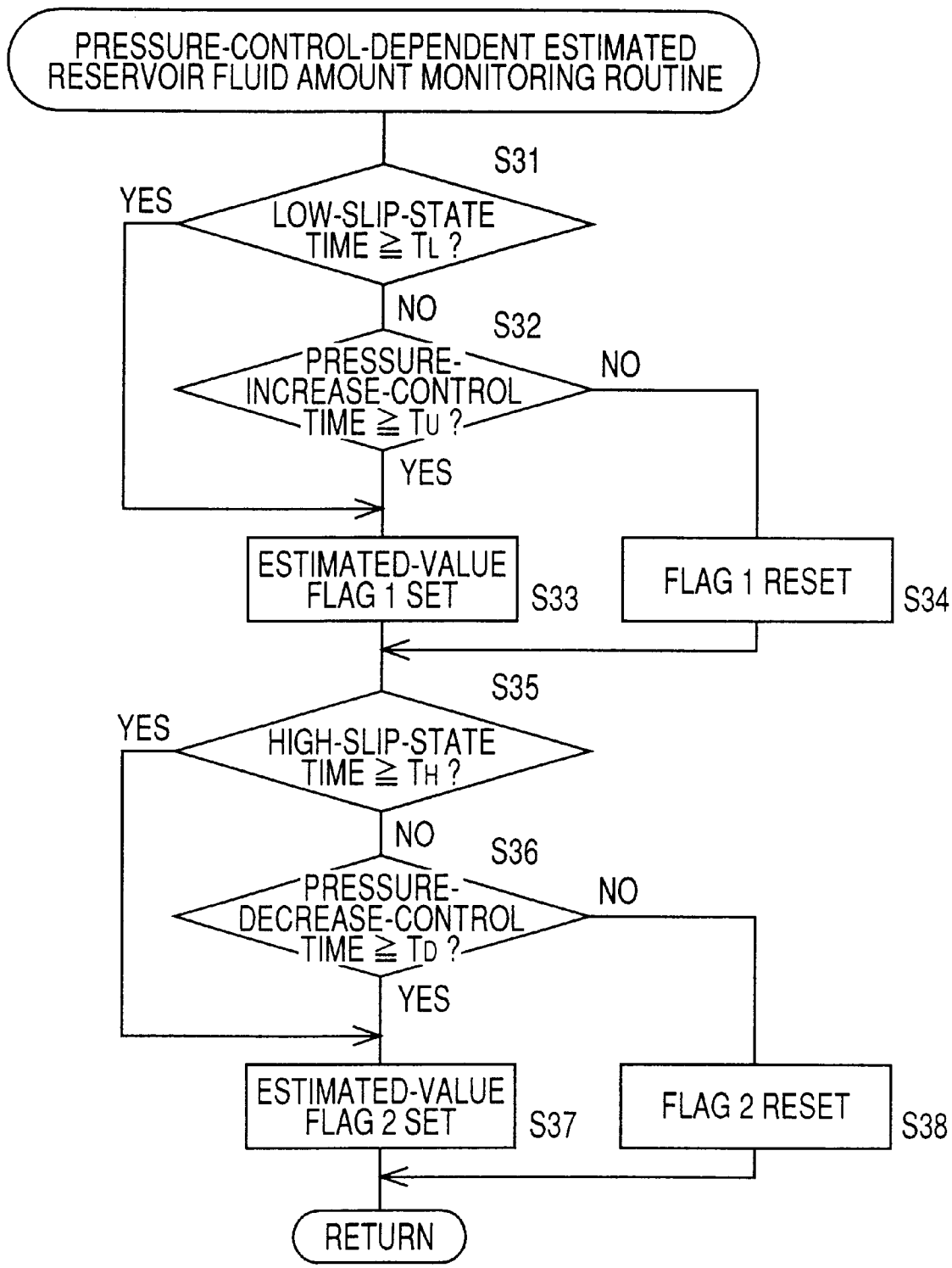
FIG. 3 is a flow chart representing a pressure-control dependent estimated reservoir fluid amount monitoring routine stored in the ROM of the controller.
Figure 4:
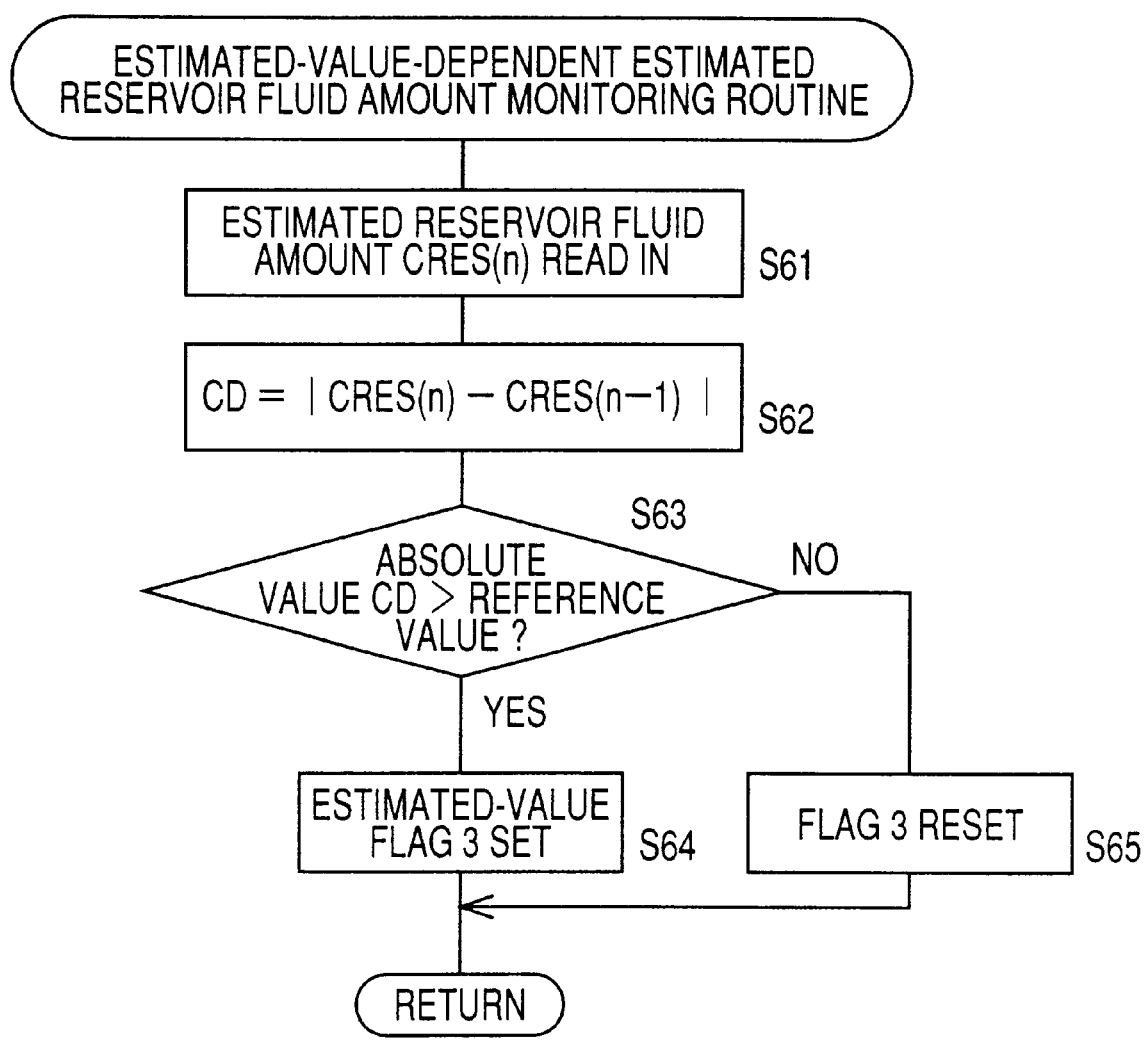
FIG. 4 is a flow chart representing an estimated-value dependent estimated reservoir fluid amount monitoring routine stored in the ROM of the controller.

The ROM of the controller 70 stores various control programs including: a control program for executing a routine for estimating an amount of the fluid stored in the reservoir 44, as illustrated in the flow chart of FIG. 2; two control programs for executing respective routines each for monitoring an estimated reservoir fluid amount, as illustrated in the respective flow charts of FIGS. 3 and 4; a control program for executing a routine for selecting a control map, as illustrated in the flow chart of FIG. 5; a control program for executing a routine for controlling an output of the motor 52, as illustrated in the flow chart of FIG. 6; and control programs for executing a routine for estimating a running speed of the vehicle, a routine for controlling an anti-lock pressure control operation, and a routine for estimating an amount of the fluid which has been pumped up by the pump 38. The ROM 70 also stores various data maps such as a control map A, a control map B, and a map, shown in FIG. 7, for selecting a flow-in rate $K_x$.

The controller 70 operates to estimate a vehicle running speed $V_{SO}$ according to the vehicle speed estimating routine and on the basis of the output signals of the wheel speed sensors 72, 74, and obtains a vehicle deceleration $DV_{SO}$ by differentiating the estimated vehicle running speed $V_{SO}$ with respect to time. Further, the controller 70 operates to obtain the slip ratios of the wheels 14, 18, etc. on the basis of the output signals of the wheel speed sensors 72, 74 and the estimated vehicle running speed.

In the anti-lock pressure control routine, the controller 70 selects one of seven pressure control modes indicated in TABLE 1, according to the control map A shown in TABLE 2 or control map B shown in TABLE 3, on the basis of the estimated vehicle running speed $V_{SO}$, the obtained vehicle deceleration $DV_{SO}$ and the obtained slip ratios of the wheels 14, 18, so that the solenoid coils of the first to third shut-off valves 30, 40, 46 and the pump motor 52 are controlled through the drivers, in the selected pressure control mode. The motor 52 is activated upon initiation of an anti-lock pressure control operation, and is held on throughout the anti-lock pressure control operation. The 52 is held on for a suitable time even after the termination of the anti-lock pressure control operation, so that the fluid stored in the reservoir 44 is entirely returned to the master cylinder 10. Therefore, no fluid is stored in the reservoir 44 upon initiation of an anti-lock pressure control operation.

TABLE 1

| | States of Shut-Off Valves | | | Pressure Control States of Front and Rear Brake Cylinders | |
|---|---|---|---|---|---|
| Mode | 1st | 2nd | 3rd | Front | Rear |
| 1 | O* | O | C* | M/C Increase | M/C Increase |
| 2 | O | C | C | M/C Increase | Hold |
| 3 | O | C | O | M/C Increase | Reduction |
| 4 | C | O | C | Hold | Pump Increase |
| 5 | C | C | C | Pump Increase | Hold |
| 6 | C | C | O | Pump Increase | Reduction |
| 7 | C | O | O | Reduction | Reduction |

"O" indicates "the open state", "C" indicates "the closed state ", and "M/C" indicates "the master cylinder 10". The pump 38 is operated in each of the first to seventh modes.

In the present embodiment, one of the control maps A and B of TABLES 2 and 3 is selected according to the control map selecting routine illustrated in the flow chart of FIG. 5. This control map selecting routine is initiated when a reservoir fluid amount CRES(n) has been estimated according to the estimating routine of FIG. 2, so that the control map A or B is selected depending upon the estimated reservoir fluid amount CRES(n). The control map selecting routine of FIG. 5 is initiated with step S1 to determine whether a reservoir fluid amount CRES(n) which has been estimated is greater than zero. If an affirmative decision (YES) is obtained in step S1, the control flow goes to step S2 to select the control map A. If the estimated reservoir fluid amount CRES(n) is equal to zero or a negative value, a negative decision (NO) is obtained in step S1. In this case, the control flow goes to step S3 to select the control map B. In other words, the control map A is selected if any fluid is stored in the reservoir 44, and the control map B is selected when no fluid is stored in the reservoir 44.

It is noted that the estimated reservoir fluid amount CRES(n) is cleared upon initialization of the controller 70 which takes place when the ignition switch of the vehicle is turned on. The estimated reservoir fluid amount CRES(n) is also cleared upon termination of each anti-lock pressure control operation of the braking system. Consequently, the estimated amount CRES(n) is zero upon initiation of each anti-lock pressure control operation. The routine to obtain the estimated reservoir fluid amount CRES(n) will be described later.

There will be described an anti-lock pressure control operation according to the control map A indicated in TABLE 2.

In TABLE 2, the symbols "↑", "↑s1", "↓" and "→" in the parentheses indicate a normally increasing state, a slowly increasing state, a decreasing state and a constant state of the fluid pressures in the front and rear wheel brake cylinders 16, 20, respectively. The symbol before "/" indicate the pressure changing state of the front wheel brake cylinder 16, while the symbol after "/" indicates the pressure changing state of the rear wheel brake cylinder 20.

An anti-lock pressure control operation may be initiated for the front right wheel 14 before initiation of

TABLE 2

CONTROL MAP A
Selected when the fluid is stored in the reservoir 44

| | Rear Wheel Brake Cylinder 20 | | | |
|---|---|---|---|---|
| | No Control | Slip Increasing | Slip Decreasing | Slip Removed |
| Front Wheel Brake Cylinder 16 | | | | |
| No Control | 1st Mode (↑/↑) | 3rd Mode (↑/↓) | 2nd Mode (↑/→) | Alternate 1st and 2nd modes (↑/↑s1) |
| Slip Incr. | 7th Mode (↓/↓) | 7th Mode (↓/↓) | 7th Mode (↓/↓) | 7th Mode (↓/↓) |
| Slip Decr. | 4th Mode (→/↑) | Alternate 5th and 7th Modes (→/↓) | Successive 5th, 7th, 4th & 7th Modes (→/→) | 4th Mode (→/↑) |
| Slip Removed | Alternate 4th and 5th Modes (↑s1/↑s1) | 6th Mode (↑/↓) | 5th Mode (↑/→) | Alternate 4th and 5th Modes (↑s1/↑s1) | an anti-lock pressure control operation for the rear left wheel 18, or vice versa, or alternatively initiated concurrently for the front right and rear left wheels 14, 18, depending upon the road surface condition and the braking forces currently acting on these wheels 14, 18. For easier explanation, there will first be described the anti-lock pressure control operation in the case where it is initiated for the rear left wheel 18.

When the rear left wheel 18 has an excessive slipping or locking tendency before the front right wheel 14, the third pressure control mode is selected, and the cut-off valve 30 and the pressure reducing valve 46 are opened while the pressure increasing and reducing valve 40 is closed. As a result, the fluid is discharged from only the rear wheel brake cylinder 20 and stored in the reservoir 44. Since the cut-off valve 30 is open, the fluid pressurized by the master cylinder 10 is supplied to the front wheel brake cylinder 16. Thus, the fluid pressure in the rear wheel brake cylinder 20 is reduced while the fluid pressure in the front wheel brake cylinder 16 is increased. That is, a pressure reducing mode is established for the rear wheel brake cylinder 20, while a pressure increasing mode is established for the front wheel brake cylinder 16.

When the slipping tendency of the rear left wheel 18 is in the process of decreasing, the second pressure control mode is selected, and the pressure increasing and reducing valve 40 and the pressure reducing valve 46 are both closed while the cut-off valve 30 is held open. Accordingly, the fluid pressure in the front wheel brake cylinder 16 is increased while the fluid pressure in the rear wheel brake cylinder 20 is maintained.

When the slipping tendency of the rear left wheel 18 has been removed, the first and second pressure control modes are alternately established. In this condition, the pressure increasing and reducing valve 40 is alternately placed in the open and closed states, while the cut-off valve 30 and the pressure reducing valve 46 are held open and closed, respectively. As a result, the pressure in the rear wheel brake cylinder 20 is alternately increased and held, whereby the pressure is slowly increased. In this embodiment, this slowing increasing mode by the alternate establishment of the first and second modes is considered as a pressure increasing mode.

If the slipping or locking tendency of the front right wheel 14 becomes excessive during the anti-lock pressure control operation for the rear left wheel 18 only, an anti-lock pressure control operation is initiated also for the front right wheel 14. In this instance, one of the fourth pressure control mode through the seventh pressure control mode is suitably selected.

As indicated above, the first, second and third pressure control modes are selectively established and the cut-off valve 30 is held open, when the anti-lock pressure control operation is effected for the rear left wheel 18 only. When the anti-lock pressure control operation is effected for the front right wheel 14 only or for both of the front and rear wheels 14, 18, the braking system is controlled in principle so as to selectively establish the fourth through seventh pressure control modes, with the cut-off valve 30 being closed. Although the cut-off valve 30 may be opened and closed in these cases, this undesirably causes a kick-back phenomenon of the brake pedal 12, and is likely to cause a great variation in the wheel brake cylinder pressure(s). In this respect, it is desirable to hold the cut-off valve 30 closed when the pressure in the front wheel brake cylinder 16 is controlled in the anti-lock fashion. Also, in this case, the pump 38 may have a low output ability.

An anti-lock pressure control operation is initiated for the rear left wheel 18 before initiation of an anti-lock pressure control operation for the front right wheel 14, for example, when the front wheel 14 lies on an area of an uneven friction-coefficient road surface which area has a relatively high friction coefficient while the rear wheel 18 lies on an area of the road surface which has a relatively low friction coefficient, or when the vehicle is turned to the left. In this case, it is preferable to maximize the pressure in the front wheel brake cylinder 16 while preventing the locking of the front wheel 14, so that the relatively high friction coefficient of the road surface area is utilized by the front wheel 14 to reduce the required braking distance of the vehicle. In the light of this fact, the present embodiment is adapted such that when an anti-lock pressure control operation is performed for the rear left wheel 18 only, the first, second and third pressure control modes are selectively established to hold the cut-off valve 30 open, for permitting the front wheel brake cylinder 16 to be supplied with the pressurized fluid from the master cylinder 10.

There will next be described an anti-lock pressure control operation where it is initiated for the front right wheel 14 before the rear left wheel 18.

When the front right wheel 14 has an excessive slipping or locking tendency, the seventh pressure control mode is selected, and the cut-off valve 30 is closed while the pressure increasing and reducing valve 40 and the pressure reducing vale 46 are both opened, so that the front and rear wheel brake cylinders 16, 20 are communicated with the reservoir 44. As a result, the fluid discharged from the front wheel brake cylinder 16 is introduced into the reservoir 44 through the second check valve 64 of the pressure reducing valve device 60 and the valves 40, 46. At the same time, the fluid charged from the rear wheel brake cylinder 20 is introduced into the reservoir 44 through the pressure reducing valve 46.

In the present braking system, the seven pressure control modes available do not include a mode for reducing only the pressure in the front wheel brake cylinder 16, as is apparent from TABLE 1. Therefore, the seventh pressure control mode is selected to reduce the pressures in both of the front and rear wheel brake cylinders 16, 20. That is, the pressure in the rear wheel brake cylinder 20 is also reduced, irrespective of the slipping condition of the rear wheel 18. Thus, a pressure reducing mode is established for both of the front and rear wheel brake cylinders 16, 20.

However, since the portion of the secondary fluid passage or rear brake cylinder passage 24 between the pressure increasing and reducing valve 40 and the P valve 36 is relatively long and has a relatively great fluid flow resistance, the fluid is less likely to be discharged from the rear wheel brake cylinder 20, so that the fluid is rapidly discharged from the front wheel brake cylinder 16.

When the slipping tendency of the front right wheel 14 turns to be decreasing by reducing the pressure in the front wheel brake cylinder 16 in the seventh pressure control mode, the fourth pressure control mode is established to open the pressure increasing and reducing valve 40 and close the pressure reducing valve 46. As a result, the front and rear wheel brake cylinders 16, 20 are disconnected from the reservoir 44, and are communicated with the delivery port of the pump 38. At this point of time, some amount of the fluid is stored in the reservoir 44, and the fluid is pumped up from the reservoir 44 and pressurized by the pump 38. The pressurized fluid is delivered from the pump 38 to the rear wheel brake cylinder 20 through the pressure increasing and reducing valve 40 and the P valve 36, whereby the pressure in the rear wheel brake cylinder 20 is increased. The pressurized fluid delivered from the pump 38 is supplied to the front wheel brake cylinder 16 through the first check valve 62 of the pressure reducing valve device 60, only after the pressure difference between the delivery pressure of the pump 38 and the pressure in the front wheel brake cylinder 16 reaches the predetermined opening pressure difference of the first check valve 62. Up to this point of time, the pressure in the front wheel brake cylinder 16 is held constant, while the pressure in the rear wheel brake cylinder 20 is increased. Thus, a pressure holding mode is established for the front wheel brake cylinder 16 while a pressure increasing mode is established for the rear wheel brake cylinder 20.

In the fourth pressure control mode established following the seventh pressure control mode, the fluid pressurized by the pump 38 is supplied to the rear wheel brake cylinder 20, to rapidly increase the pressure in the rear wheel brake cylinder 20 which has been unnecessarily reduced in the seventh pressure control mode.

The fluid pressurized by the pump 38 is supplied to the front wheel brake cylinder 16 through the first check valve 62 if the fourth pressure control mode is established for a comparatively long time, or if the fluid pressure in the rear wheel brake cylinder 20 at the time the fourth pressure control mode is established is not so low. In this case, therefore, the pressure in the front wheel brake cylinder 16 may be considered to be normally increased or slowly increased. In the present embodiment, however, the fourth pressure control mode is selected for the purpose of maintaining the pressure in the front wheel brake cylinder 16. In this sense, the fourth pressure control mode may be considered as a pressure holding mode for the front wheel brake cylinder 16.

When the slipping tendency of the front right wheel 14 has been removed, the fourth and fifth pressure control modes are alternately established. That is, the pressure increasing and reducing valve 40 is alternately opened and closed while the pressure reducing valve 46 is held closed. When the pressure increasing and reducing valve 40 is in the closed state, the front and rear wheel brake cylinders 16, 20 are both disconnected from the reservoir 44, while the delivery port of the pump 38 is communicated with the front wheel brake cylinder 16. The fluid delivered from the pump 28 is not supplied to the rear wheel brake cylinder 20, but is supplied to only the front wheel brake cylinder 16. When the valve 40 is in the open state, the fluid pressurized by the pump 38 is supplied primarily to the rear wheel brake cylinder 20.

With the fourth and fifth pressure control modes alternately established, the pressure in the front wheel brake cylinder 16 is alternately held and increased, and is slowly increased. On the other hand, the pressure in the rear wheel brake cylinder 20 is alternately increased and held while the pressure in the rear wheel brake cylinder 20 is alternately held and increased, respectively, whereby the pressure in the front wheel brake cylinder 16 is also slowly increased.

Thus, the seventh, fourth and fifth pressure control modes are selectively established depending upon the slip ratio of the front right wheel 14, when the anti-lock pressure control operation is effected for only the front right wheel 14. In the seventh pressure control mode, the pressures in the front and rear wheel brake cylinders 16, 20 are concurrently reduced, as described above. Therefore, if the anti-lock pressure control operation is initiated first for the front right wheel 14, the anti-lock pressure control operation is unlikely initiated for the rear left wheel 18, since the pressure in the rear wheel brake cylinder 20 has been reduced in the seventh pressure control mode and the rear wheel 18 is less likely to have an excessive slipping tendency.

In the case where the fourth pressure control mode is established following the seventh pressure control mode, and the fourth and fifth pressure control modes are then alternately established, the pressure in the rear wheel brake cylinder 20 is increased, and the rear wheel 18 may possibly have an excessive slipping tendency. In this case, an anti-lock pressure control operation is initiated also for the rear left wheel 18.

The above case is an example of the cases where the anti-lock pressure control operation is initiated for the rear left wheel 18 during the anti-lock pressure control operation for the front right wheel 14. However, the anti-lock pressure control operation may be initiated for the rear left wheel 18 during the anti-lock pressure control operation for the front right wheel 14, in other situations depending upon the road surface condition, for example.

In rare cases, the anti-lock pressure control operations are initiated simultaneously for the front and rear wheels 14, 18.

There will be described the anti-lock pressure control operations performed simultaneously for the front right and rear left wheels 14, 18. It is noted that the seventh pressure control mode is established to reduce the fluid pressures in both of the front and rear wheel brake cylinders 16, 20, as described above, if at least the front right wheel 14 has an excessive slipping tendency, namely, if both of the front right and rear left wheels 14, 18 have excessive slipping tendencies or if only the front right wheel 14 has an excessive slipping tendency.

If the slipping tendency of the front right wheel 14 is decreasing while the slipping tendency of the rear left wheel 18 is still excessive, the fifth and seventh pressure control modes are alternately established. In the fifth pressure control mode, both the pressure increasing and reducing valve 40 and the pressure reducing valve 46 are closed, so that the fluid delivered from the pump 38 is supplied to the front wheel brake cylinder 16 through the first check valve 62 of the pressure reducing valve device 60. When the seventh pressure control mode is established, the front and rear wheel brake cylinders 16, 20 are both communicated with the reservoir 44, as described above. Thus, by alternately establishing the fifth and seventh pressure control modes, the pressure in the front wheel brake cylinder 16 is alternately increased and reduced, and is consequently held constant. On the other hand, the pressure in the rear wheel brake cylinder 20 is alternately held and reduced, and is consequently reduced. Thus, a pressure holding mode is established for the front wheel brake cylinder 16 while a pressure reducing mode is established for the rear wheel brake cylinder 20.

If the slipping tendency of the front right wheel 14 has been removed while the slipping tendency of the rear left wheel 18 is still excessive, the sixth pressure control mode is established to reduce the pressure in the rear wheel brake cylinder 20 and increase the pressure in the front wheel brake cylinder 16. Thus, a pressure increasing mode is established for the front wheel brake cylinder 16 while a pressure reducing mode is established for the rear wheel brake cylinder 20.

If the slipping tendencies of the front and rear wheels 14, 18 are both in the processing of decreasing, the fifth, seventh, fourth, and seventh pressure control modes are successively established to primarily open the pressure increasing and reducing valve 40 and alternately close and open the pressure reducing valve 46. As a result, the pressure in the front wheel brake cylinder 16 is successively increased, reduced, held, and reduced, while the pressure in the rear wheel brake cylinder 20 is successively held, reduced, increased, and reduced. The valves 40, 46 are opened and closed for the purpose of holding both the pressures in the front and rear wheel brake cylinders 16, 20.

If the slipping tendency of the front right wheel 14 has been removed while the slipping tendency of the rear left wheel 18 is in the process of decreasing, the fifth pressure control mode is established to close both of the valves 40, 46. As a result, the pressure in the front wheel brake cylinder 16 is increased while the pressure in the rear wheel brake cylinder 20 is held. Thus, a pressure increasing mode and a pressure holding mode are established for the front and rear wheel brake cylinders 16, 20, respectively.

If the slipping tendency of the front right wheel 14 is in the process of decreasing while the slipping tendency of the rear left wheel 18 has been removed, the fourth pressure control mode is established. If the slipping tendencies of the front and rear wheels 14, 18 have been removed, the fourth and fifth pressure control modes are alternately established.

During an anti-lock pressure control operation, the pump 38 is held on. If the amount of the fluid delivered by the pump 38 becomes excessive, the fluid is returned to the master cylinder 10 through the by-pass return passage 32. In other words, the pressure in the front wheel brake cylinder 16 cannot be made higher than the pressure in the master cylinder 10. Thus, the check valve 34 also functions as a pressure relief valve.

It is noted that since the cut-off valve 30 is held closed throughout an anti-lock pressure control operation or operations (for only the front right wheel 14 or for both of the front right and rear left wheels 14, 18) according to the control map A of TABLE 2, the reservoir 44 may be empty during the anti-lock pressure control operation or operations. In this event, the pressurized fluid cannot be supplied to the front and rear wheel brake cylinders 16, 20, and the pressures in these cylinders 16, 20 cannot be increased. In the light of this fact, the present braking system is adapted to estimate the amount of the fluid stored in the reservoir 44, and to effect the anti-lock pressure control operations according to the control map B indicated in TABLE 3.

TABLE 3

CONTROL MAP B
Selected when the resevoir 44 is substantially empty

| | Rear Wheel Brake Cylinder 20 | | | |
|---|---|---|---|---|
| Front Wheel Brake Cylinder 16 | No Control | Slip Increasing | Slip Decreasing | Slip Removed |
| No Control | 1st Mode | 3rd Mode | 2nd Mode | Alternate 1st and 2nd |
| Slip Incr. | 7th Mode | 7th Mode | 7th Mode | 7th Mode |
| Slip Decr. | 4th Mode | Alternate 5th and 7th Modes | Successive 5th, 7th, 4th & 7th Modes | 4th Mode |
| Slip Removed | Successive 1st, 4th, 2nd and 5th Modes | 3rd and 6th Modes | 2nd and 5th Modes | Successive 1st, 4th, 2nd and 5th Modes |

There will be described the anti-lock pressure control operation according to the control map B. The control map B of TABLE 3 is different from the control map A after the slipping tendency of the front right wheel 14 has been removed (after the slipping tendencies of the front and rear wheels 14, 18 have been both removed). In the other cases, the control maps A and B are identical with each other.

The control map B is formulated in view of a fact that the reservoir 44 does not become substantially empty, except in the case where the slipping tendency of the front right wheel 14 has been removed.

If an anti-lock pressure control operation is not performed for the front right wheel 14, the first, second and third pressure control modes are selectively established depending upon the slipping condition of the rear left wheel 18. In these cases, the cut-off valve 30 is held open, and the reservoir 44 will not become empty. If the front right wheel 14 has an excessive slipping tendency, the pressure in the front wheel brake cylinder 16 is reduced, and the amount of the fluid in the reservoir 44 is increased.

If the slipping tendency of the front right wheel 14 is in the process of decreasing, on the other hand, the fourth through seventh pressure control modes are selectively established, and the pressure in the front or rear wheel brake cylinder 16, 20 is increased in some cases. However, the pressure in the front wheel brake cylinder 16 is first reduced and then increased or held either by the alternate establishment of the fifth and seventh pressure control modes or the fifth and seventh pressure control modes, or by the successive establishment of the fifth, seventh, fourth, and seventh pressure control modes, so that the amount of the fluid in the reservoir 44 will not be reduced to a large extent. In the fourth pressure control mode, the pressure in the front wheel brake cylinder 16 is maintained while the pressure in the rear wheel brake cylinder 20 is increased, whereby the amount of the fluid in the reservoir 44 will be reduced. However, the fourth pressure control mode necessarily immediately follows the seventh pressure control mode, that is, immediately after the amount of the fluid in the reservoir 44 has been increased. Therefore, the reservoir 44 will not become empty in the fourth pressure control mode. The pressure in the rear wheel brake cylinder 20 is alternately held (or increased) and reduced by the successive establishment of the fifth, seventh, fourth, and seventh pressure control modes, so that the amount of the fluid in the reservoir 44 will not become empty.

If the slipping tendency of the front right wheel 14 has been removed while an anti-lock pressure control operation is performed for only the front right wheel 14, the fourth and fifth pressure control modes are alternately established according to the control map A described above. According to the control map B, however, the first, fourth, second and fifth pressure control modes are successively established repeatedly. That is, the cut-off valve 30 and the pressure increasing and reducing valve 40 are both alternately opened and closed while the pressure reducing valve 46 is held closed. When the cut-off valve 30 is open, the fluid pressurized by the master cylinder 10 is supplied to the front and rear wheel brake cylinders 16, 20, so that the reservoir 44 is prevented from becoming empty.

If the slipping tendency of the front right wheel 14 has been decreased while the slipping tendency of the rear left wheel 18 is still excessive during anti-lock pressure control operations for both of the front and rear wheels 14, 18, the third and sixth pressure control modes are alternately established. In this case, the cut-off valve 30 is alternately opened and closed while the pressure increasing and reducing valve 40 and the pressure reducing valve 46 are held closed and open, respectively. When the cut-off valve 30 is open, the fluid is supplied from the master cylinder 10 to the front wheel brake cylinder 16.

If the slipping tendency of the front right wheel 14 has been removed while the slipping tendency of the rear left wheel 18 is in the process of decreasing, the fifth and second pressure control modes are alternately established. In this instance, the cut-off valve 30 is alternately opened and closed while the pressure increasing and reducing valve 40 and the pressure reducing valve 46 are both held closed. Consequently, the fluid is supplied from the master cylinder 10 to the front wheel brake cylinder 16.

If the slipping tendencies of the front and rear wheels 14, 18 have both been removed, the control is the same as in the above-described case where the slipping tendency of the front right wheel 14 has been removed while an anti-lock pressure control operation is performed for only the front right wheel 14.

In the present braking system, an anti-lock pressure control operation is performed according to the control map A or B as described above. This braking system is provided with the pressure reducing valve device 60, and the pressurized fluid delivered from the pump 38 is supplied to the front wheel brake cylinder 16 through the pressure reducing valve device 60. In the fourth pressure control mode, the fluid in the reservoir 44 is pumped up and pressurized by the pump 38, and is delivered to the rear wheel brake cylinder 20. However, the pressurized fluid delivered from the pump 38 is not supplied to the front wheel brake cylinder 16 until the first check valve 62 of the pressure reducing valve device 60 has been opened. That is, only the pressure in the rear wheel brake cylinder 20 is increased while the pressure in the front wheel brake cylinder 16 is held constant. Accordingly, it is possible to rapidly increase the rear wheel braking force at a comparatively early point of time in the anti-lock pressure control operation. Further, an increase in the rear wheel braking force relative to the front wheel braking force can be achieved in such a manner effective to prevent locking of the rear wheel 18 with higher stability than in the conventional braking system. In addition, since the distribution point of the front and rear wheel braking forces can be more easily moved toward the condition in which the rear wheel braking force is greater than the front wheel braking force, during the anti-lock pressure control operation, the actual distribution curve of the front and rear wheel braking forces can be made closer to an ideal distribution curve for a full-load run of the vehicle.

There will next be described the routine for estimating the amount of the fluid stored in the reservoir 44 which is commonly provided for both the front wheel cylinder 16 for the front right wheel 14 and the rear wheel cylinder 20 for the left rear wheel 18. Since the amount of the fluid stored in the reservoir which is commonly provided for both the front wheel cylinder for the front left wheel and the rear wheel cylinder for the right rear wheel is performed in the same way, the description there is omitted.

The reservoir fluid amount is estimated on the basis of an estimated cumulative amount of the fluid which has been introduced into the reservoir 44, and an estimated cumulative amount of the fluid which has been pumped up by the pump 38.

The cumulative amount of the fluid which has been introduced into the reservoir 44 (hereinafter referred to as "cumulative fluid flow-in amount") is estimated on the basis of a product of a pressure reducing time during which a pressure reducing mode is established for each of the front and rear wheel brake cylinders 16, 20, and an amount of the fluid which is discharged from each of the front and rear wheel brake cylinders 16, 20 into the reservoir 44 per unit time, namely, a rate of flow of the fluid into the reservoir 44 (hereinafter, referred to as the "flow-in rate $K_x$ (x=f (front), r (rear))").

While the flow-in rate $K_x$ increases with an increase in the pressure difference between the wheel brake cylinder and the reservoir 44, the flow-in rate $K_x$ increases with an increase in the wheel brake cylinder pressure since the pressure in the reservoir 44 is held substantially constant. Hence, there is a certain relationship between the vehicle deceleration and the flow-in rate $K_x$. The flow-in rate $K_x$ is determined according to the flow-in rate selecting map shown in FIG. 7, based on an obtained vehicle deceleration and the respective states of flow-in rate determining flags, as will be described later.

The cumulative amount of the fluid which has been pumped up (hereinafter referred to as "cumulative fluid flow-out amount") is estimated according to a suitable routine (not illustrated).

The cumulative fluid flow-out amount, that is, the cumulative amount of the fluid which has been pumped up by the pump 38 is estimated on the basis of a product of an operating time of the pump 38 and a delivery rate of the pump (i.e., rate of flow of the fluid delivered from the pump 38). The delivery rate of the pump 38 increases with an increase in the electric current supplied to the motor 52. In the present embodiment, however, the electric voltage supplied to the motor 52 is maintained in the anti-lock pressure control operation. The motor 52 is controlled according to the motor output controlling routine shown in FIG. 6. At Step S4, the CPU of the controller 70 reads in an estimated reservoir fluid amount CRES(n) and judges whether the fluid amount CRES(n) is not less than the capacity of the reservoir 44. If a negative judgment is made at Step S4, the control of the CPU goes to Step S6 to supply the electric current to the motor 52 at a predetermined duty ratio smaller than 1. On the other hand, if a positive judgment is made at Step S4, the control goes to Step S5 to supply the electric current to the motor 52 at a maximum duty ratio equal to 1. Consequently, the output of the motor 52 is maximized, so that the fluid is quickly pumped up from the reservoir 44.

Since the pump 38 is kept operated through an anti-lock pressure control operation in the present embodiment, the operating time of the pump 38 is usually a time interval between the last and present cycles of estimation of the cumulative fluid flow-out amount. In the first estimation cycle after initiation of the anti-lock pressure control operation, the operating time of the pump 38 is a time length from the moment of initiation of the anti-lock pressure control operation and the moment of estimation in the present estimation cycle. The cumulative fluid flow-out amount increases with an increase in the operating time of the pump 38.

While reservoir fluid amounts CRES(n) are estimated according to the routine shown in FIG. 2, the CPU of the controller 70 reads in a pressure control mode (pressure increasing, reducing, or holding mode) which is currently established for a current wheel 14, 18 according to the anti-lock pressure controlling routine. This is performed by timer interruption. If the current control mode is the pressure reducing mode, the CPU measures a pressure reducing time $t_{dx}$ ($t_{df}$, $t_{dr}$) in which the pressure reducing mode is established for the current wheel 14, 18 in a time interval between the last and present cycles of estimation of the cumulative fluid flow-out amount, that is, time in which the fluid is discharged from the brake wheel cylinder 16, 20 for the current wheel 14, 18 and flows into the reservoir 44. The pressure reducing time $t_{dx}$ is reset to zero when each reservoir fluid amount estimation is finished, but continues to increase so long as the pressure reducing mode is maintained for the current wheel 14, 18.

Referring to the flow chart of FIG. 4, the routine for estimating the reservoir fluid amount will be explained. This routine is executed while an anti-lock pressure control operation is performed for at least one of the two wheels 14, 18, i.e., the two brake cylinders 16, 20. When the anti-lock pressure control operation is finished for both of the two wheels 14, 18, the execution of the routine is no longer performed and the estimated reservoir fluid amount CRES (n) is reset to zero.

The routine is initiated with step S11 to determine whether at least one of three estimated-value flags (which will be described later) has been changed from its reset state to its set state. If a positive judgment is made at Step S11, the control of the CPU of the controller 70 does not go to Steps S12 to S19 but goes to Step S22 and the following steps, that is, change the current estimated reservoir fluid amount CRES(n) to a predetermined value.

Step S12 to S16 are carried out individually for each of the two wheels 14, 18. After Steps S12 to S16 are carried out for both of the two wheels 14, 18, the control goes to Steps S18 and S19 to estimate a reservoir fluid amount CRES(n).

At Step S12, the CPU judges whether an anti-lock pressure control operation is performed for a current wheel 14, 18. If an affirmative decision (YES) is obtained in Step S12, the control flow goes to Step S13 to determine whether a pressure reducing mode is established for the wheel 14, 18. If a negative decision (NO) is obtained in Step S12, Step S17 is implemented.

In the case where the current wheel is the front right wheel 14, the CPU judges whether an anti-lock pressure control operation has been established for the front wheel 14 only. On the other hand, however, if the current wheel is the rear left wheel 18, the CPU judges whether an anti-lock pressure control operation has been established for not only the rear wheel 18 but also the front wheel 14 which shares the pressure reducing valve 46 with the rear wheel 18. Similarly, if the current wheel is the rear right wheel, the CPU judges whether an anti-lock pressure control operation has been established for not only the rear right wheel but also the front left wheel which shares a pressure reducing valve with the rear right wheel. In the latter case, if an anti-lock pressure control operation has been established for at least one of the rear wheel 18 and the front wheel 14, a positive judgment is made at Step S12.

For example, in the case where the seventh mode has been established for the front right wheel 14 and accordingly the pressure reducing mode has been established for the same 14, as indicated in the control map A of TABLE 2, the pressure reducing mode has been established also for the rear left wheel 18, even though no anti-lock pressure control operation has been established for the rear wheel 18 according to the anti-lock pressure controlling routine. Therefore, if an anti-lock pressure control operation is carried out for the front wheel 14 though no anti-lock pressure control operation is carried out for the rear wheel 18, the control of the CPU goes to Step S13 to judge whether the pressure reducing mode has been established for the rear wheel 18.

If a positive judgment is made for the front wheel 14 at Step S12, a flow-rate determining flag is set to one; and on the other hand, if a positive judgment is made for the rear wheel 18 only, the flow-rate determining flag is reset to zero. The flow-rate determining flag will be utilized for selecting a flow-in rate $K_x$, at Step S15. The reservoir passage or pressure reducing passage 42 is so constructed as if it had a pressure reducing orifice which determines different flow-in rates $K_x$ for the first case where the fluid is discharged from both the front and rear wheel cylinders 16, 20 and the second case where the fluid is discharged from the rear wheel cylinder 20 only, respectively.

When the pressure reducing mode is established for the front wheel 14, it is also established for the rear wheel 18, as described above. Therefore, if the flow-rate determining flag has been set, the fluid is being discharged from both the front and rear brake cylinders 16, 20; and if the flow-rate determining flag has been reset, the fluid is being discharged from the rear brake cylinder 20 only.

If a positive judgment is made at Step S13, the control of the CPU goes to Step S14 to read in a vehicle deceleration $DV_{SO}$ determined as described previously, and further to Step S15 to select a flow-in rate $K_x$ according to the flow-in rate selecting map shown in FIG. 7, based on the vehicle deceleration $DV_{SO}$ and the set or reset state of the flow-rate determining flag.

In the case where the pressure reducing mode has been established for the front wheel 14, the flow-rate determining flag has been set. Accordingly, a flow-in rate $K_f$ is determined as one selected from three predetermined values $K_{fr1}$, $K_{fr2}$, $K_{fr3}$ corresponding to three predetermined vehicle deceleration ranges. In the case where the pressure reducing mode has been established for the rear wheel 18, the flow-rate determining flag has been set if the seventh mode has been selected and, on the other hand, the flag has been reset if the sixth or third mode has been selected. In the case where the flag has been reset, a flow-in rate $K_r$ is determined as one selected from three predetermined values $K_{r1}$, $K_{r2}$, $K_{r3}$ corresponding to the three predetermined vehicle deceleration ranges; and in the case where the flag has been set, the flow-in rate $K_r$ is determined as one selected from three predetermined values $K_{rf1}$, $K_{rf2}$, $K_{rf3}$ corresponding to the three predetermined vehicle deceleration ranges.

Step S15 is followed by Step S16 to read in a pressure reducing time $t_{dx}$ determined as described previously, and further by Step S17 to judge whether the preceding steps have been carried our for each of the front and rear wheels 14, 18. If a negative judgment is made at Step S17, the control of the CPU of the controller 70 goes back to Step S12, so that the same steps may be carried out for the other wheel 14, 18. On the other hand, if a positive judgment is made at Step S17, the control of the CPU goes to Step S18.

At Step S18, the CPU reads in a cumulative amount KPUMPUP of the fluid which has been pumped up by the pump 38 from the reservoir 44 after the preceding estimation of the reservoir fluid amount CRES(n−1). Step S18 is followed by Step S19 to determine a current estimated reservoir fluid amount CRES(n) according to the following expression:

$$CRES(n) = CRES(n-1) + t_{df} \times K_f + t_{dr} \times K_r - KPUMPUP$$

A time interval between the preceding estimation of the reservoir fluid amount CRES(n−1) at Step S19 in the preceding control cycle and the current estimation of the reservoir fluid amount CRES(n) at Step S19 in the current control cycle. The CPU estimates the cumulative fluid flow-in amount and the cumulative fluid flow-out amount during that time interval, and obtains the current estimated reservoir fluid amount CRES(n) based on the estimated cumulative fluid flow-in and flow-out amounts. As described previously, in the present embodiment, the reservoir 44 stores the fluid discharged from the respective brake cylinders 16, 20 for the front right and rear left wheels 14, 18, and the other reservoir (not shown) stores the fluid discharged from the respective brake cylinders for the front left and rear right wheels. Thus, the estimation of reservoir fluid amount is carried out for each of the two reservoirs.

Step S19 is followed by Step S20 to replace the preceding value CRES(n−1) with the current value CRES(n) and further by Step S21 to reset the pressure reducing time measured for each of the two wheels 14, 18, to zero.

Each of the three estimated-value flags is set or reset according to the estimated reservoir fluid amount monitoring routines represented by the flow charts of FIGS. 3 and 4.

First, at Step S31, the CPU of the controller 70 judges whether a low-slip state of the front right wheel 14 has continued for not less than a predetermined time $T_L$. More specifically described, the CPU reads in a slip ratio of the front wheel 14 determined as described previously, and judges whether the read-in slip ratio is smaller than a predetermined low slip ratio $S_L$. If a positive judgment is made, a counter adds one to measure the low-slip state of the front wheel 14. Thus, the CPU judges whether the low-slip-state time measured by the counter is not less than the predetermined time $T_L$. In the present embodiment, the CPU makes this judgment based on the slip ratio of the front wheel 14.

Step S31 is followed by Step S32 to judge whether a pressure increasing control has continued for not less than a predetermined time $T_U$. So long as the pressure increasing mode or the pressure slow-increasing mode continues, a counter measures the time. The CPU judges whether the pressure-increase-control time measured by the counter is not less than the predetermined time $T_U$.

If a positive judgment is made at at least one of Steps S31 and S32, the control of the CPU goes to Step S33 to set the estimated-value flag 1 to one; on the other hand, if a negative judgment is made at each of Steps S31 and S32, the control of the CPU goes to Step S34 to reset the estimated-value flag 1 to zero.

Thus, the estimated reservoir fluid amount values CRES (n) are monitored based on the slip ratio values of the front wheel 14 and the pressure control modes established for the same 14. However, it is possible to monitor the estimated values CRES(n) based on the slip ratio values of the rear wheel 18 and the pressure control modes established for the same 18, or alternatively to monitor the estimated values CRES(n) based on the respective slip ratio values of the front and rear wheels 14, 18 and the respective pressure control modes established for the same 14, 18.

A positive judgment may be made at Step S32, for example, in the case where the reservoir 44 is short of the fluid and cannot supply the fluid to the front brake cylinder 16. If the estimated reservoir fluid amount is not greater than zero, the control map B is selected at Step S2 as described previously, so that the cut-off valve 30 is alternatively opened and closed. Consequently, the fluid is supplied to the front brake cylinder 16, and the pressure in the cylinder 16 is increased, so that the pressure reducing or holding control may be established in place of the pressure increasing control. Thus, it is natural that the continuous pressure increasing time should not be longer than the predetermined time $T_U$. However, in the case where the estimated reservoir fluid amount is greater than zero though the actual reservoir fluid amount is zero, the cuff-off valve 30 is held closed and the fluid is not supplied to the front brake cylinder 16.

A positive judgment may be made at Step S31, for example, in the case where the rate of delivery of the pump 38 is excessively low and accordingly a sufficiently high pressure-increase rate cannot be obtained. When the vehicle moves from a road surface having a low friction coefficient $\mu$ to a road surface having a high friction coefficient, during an anti-lock pressure control operation, it is desirable to increase quickly the pressure in the front wheel cylinder 16. If, however, the rate of delivery of the pump 38 is excessively low, no sufficient amount of the fluid can be supplied to the brake cylinder 16. In this case, the estimated reservoir fluid amount may not be different from the actual reservoir fluid amount.

Similarly, at Step S35, the CPU of the controller 70 judges whether a high-slip state of the front right wheel 14 has continued for not less than a predetermined time $T_H$ and, at Step S36, the CPU judges whether a pressure reducing control has continued for not less than a predetermined time $T_D$. If a positive judgment is made at least one of Steps S35 and S36, the control of the CPU goes to Step S37 to set the estimated-value flag 2 to one; on the other hand, if a negative judgment is made at each of Steps S35 and S36, the control of the CPU goes to Step S38 to reset the estimated-value flag 2 to zero.

If the high-slip state continues for not less than the predetermined time $T_H$, or if the pressure-reduce-control time continues for not less than the predetermined time $T_D$, it can be estimated that the actual reservoir fluid amount is superfluous and a sufficient amount of the fluid cannot be discharged from the front wheel cylinder 16. If the estimated reservoir fluid amount is equal to the capacity or volume of the reservoir 44, the CPU supplies the electric current to the motor 52 at the maximum duty ratio (i.e., one), so that the fluid is quickly pumped up from the reservoir 44. Thus, it is natural that the reservoir 44 should not be so superfluous that the fluid cannot well be discharged from the front brake cylinder 16. If, however, the estimated reservoir fluid amount is smaller than the actual amount, the delivery rate of the pump 38 is not maximized.

Since the estimated-value flag 1 may be set during a pressure increasing control and the estimated-value flag 2 may be set during a pressure reducing control, there is no possibility that both of the two flags 1, 2 be set to one.

Subsequently, at Step S61, the CPU of the controller 70 reads in the current estimated reservoir fluid amount CRES(n) obtained as described above. At Step S62, the CPU calculates an absolute value CD of the difference between the current value CRES(n) and the preceding value CRES(n−1). At Step S63, the CPU judges whether the absolute value CD is greater than a reference value. If a positive judgment is made at Step S63, the estimated-value flag 3 is set to one at Step S64; and, on the other hand, if a negative judgment is made at Step S63, the estimated-value flag 3 is reset to zero at Step S65.

For example, in the case where an abnormality occurs to the electric circuit of the controller 70 and abnormal estimated reservoir fluid amounts are provided by the controller 70, the absolute value of change of the estimated values becomes greater than a reference value which never occurs in the anti-lock pressure control operation. Therefore, if the absolute value of change of the estimated reservoir fluid amount values is greater than the reference value, it can be estimated that some abnormality has occurred to the electric circuit or other elements of the controller 70. The absolute value CD can be said as an estimated-reservoir-fluid-amount-related value which relates to the estimated reservoir fluid amount.

Thus, the estimated-value flag 3 is set or reset based on the estimated-reservoir-fluid-amount-related value CD, whereas the estimated-value flags 1, 2 are set or reset based on the front-brake-cylinder pressure-control time. Accordingly, it is possible that the third flag 3 be set while one of the first and second flags 1, 2 be set. In this case, the current estimated reservoir fluid amount is changed to a predetermined value, based on the set or reset state of the first or second flag 1, 2 only, in the present embodiment.

The third flag 3 is set or reset based on the parameter CD indicating how the reservoir fluid amount is estimated, whereas the first and second flags 1, 2 are set or reset based on the parameters indicating how the pressure in the front brake cylinder 16 is increased or reduced. In other words, the estimated reservoir fluid amount values are directly monitored according to the estimated-value-dependent estimated reservoir fluid amount monitoring routine represented by the flow chart of FIG. 4, whereas the estimated values are indirectly monitored according to the pressure-control-dependent estimated reservoir fluid amount monitoring routine represented by the flow chart of FIG. 3. Accordingly, it can be said that the estimated-value-dependent estimated reservoir fluid amount monitoring routine is a direct estimated reservoir fluid amount monitoring routine and the pressure-control-dependent estimated reservoir fluid amount monitoring routine is an indirect estimated reservoir fluid amount monitoring routine.

Thus, each of the three estimated-value flags 1, 2, 3 is set or reset according to the two routines of FIGS. 3 and 4. If at least one of the three flags 1, 2, 3 has been changed from the set state to the reset state, a positive judgment is made at Step S11, so that the control of the CPU goes to Step S22 to judge whether the first or second flag 1, 2 has been set. If a positive judgment is made at Step S22, the control of the CPU goes to Step S23 to judge whether the first flag 1 has been set.

In the case where the first flag 1 has been set, a positive judgment is made at each of Steps S22 and S23, and the control of the CPU goes to Step S24 to change the current estimated reservoir fluid amount CRES(n) to zero. In the case where the second flag 2 has been set, a positive judgment is made at Step S22 and a negative judgment is made at Step S23, and the control of the CPU goes to Step S25 to change the current estimated reservoir fluid amount CRES(n) to a value indicative of the capacity or volume of the reservoir 44. On the other hand, if neither of the first and second flags 1, 2 has been set and the third flag 3 has been set, a negative judgment is made at Step S22, and the control goes to Step S26 to change the current estimated reservoir fluid amount CRES(n) to an average value of the reservoir fluid amount. Subsequently, the control of the CPU goes to Step S20 to replace the preceding value CRES(n-1) with the current value CRES(n) and clear each of the two measured pressure reducing times to zero. Thus, the following estimation of the reservoir fluid amount will be carried out based on the thus changed value (e.g., zero, capacity of the reservoir 44, or average value).

In the present embodiment, at Step S1, the current estimated reservoir fluid amount CRES(n) is compared with zero as the lower limit value and, at Step S24, the current estimated value CRES(n) is changed to zero as the minimum value. Thus, in the present embodiment, both the lower limit value and the minimum value are zero. However, the lower limit value may be greater than zero.

If the current estimated reservoir fluid amount CRES(n) is not greater than zero, the control map B indicated in TABLE 3 is selected at Step S3, as described previously. On the other hand, if the current estimated value CRES(n) is not less than the capacity of the reservoir 44, the motor 52 is supplied with the electric current at the maximum duty ratio equal to one, that is, supplied with the maximum electric current, at Step S5.

Next, some actual anti-lock pressure control operations will be described by reference to FIGS. 8, 9, and 10.

Figure 8:
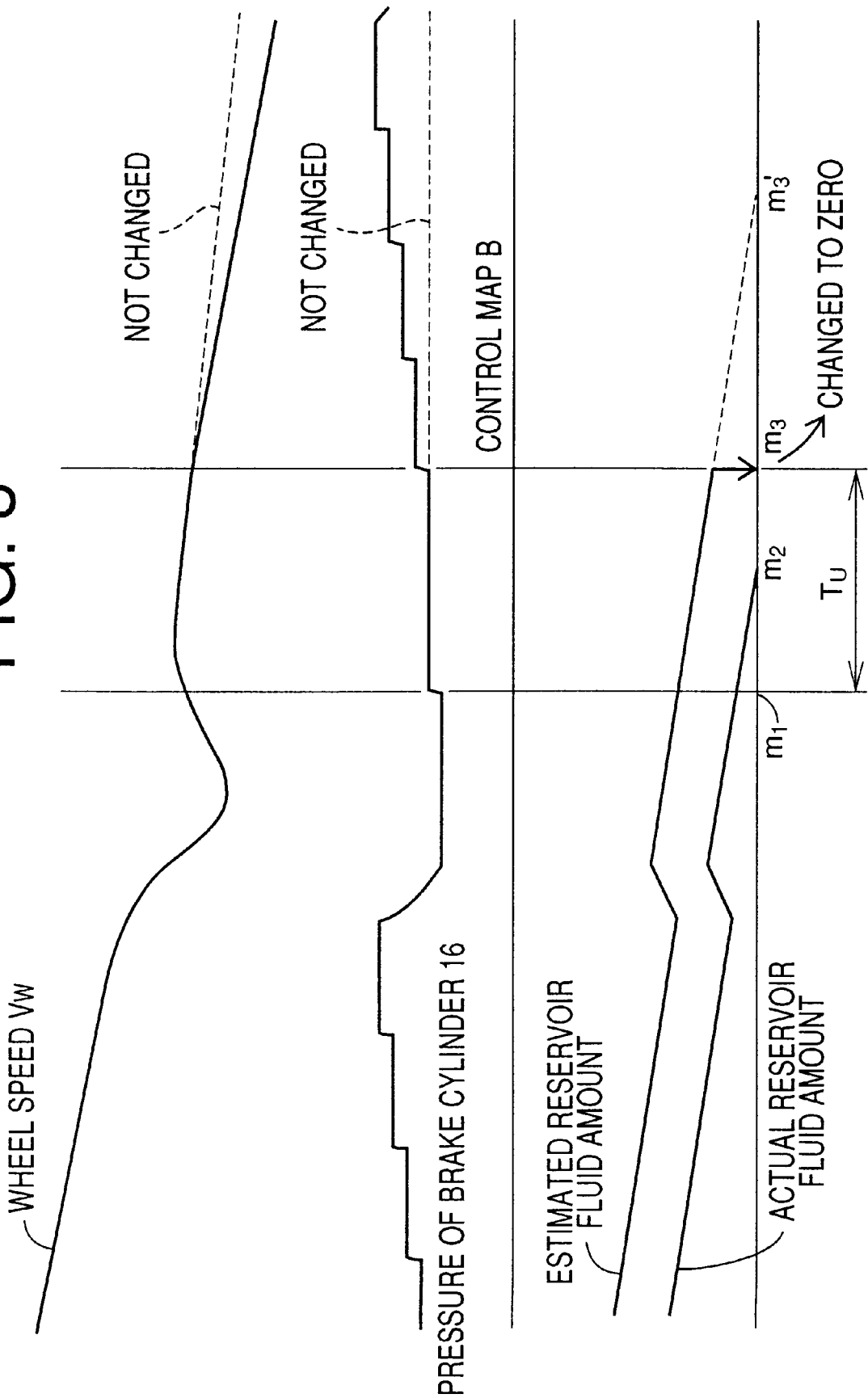
FIG. 8 is a graph showing an example of a relationship between brake cylinder pressure and estimated reservoir fluid amount which is obtained when the control apparatus of FIG. 1 actually operates.

FIG. 8 shows the case where an estimated reservoir fluid amount value CRES(n) is greater than an actual value. The pressure increase or slow-increase mode is established at a point of time $m_1$ because of removing of the slipping tendency of the front wheel 14, and the fluid is supplied to the front brake cylinder 16. Since the estimated value CRES(n) is greater than zero, the current anti-lock pressure control operation is carried out according to the control map A. However, the actual reservoir fluid amount value is smaller than the estimated value CRES(n), and becomes zero at a point of time $m_2$, so that no fluid can be supplied to the front brake cylinder 16 and the pressure in the brake cylinder 16 cannot be increased. Consequently the pressure-reduce-control or pressure-hold-control starting condition is not satisfied, and the pressure-increase-control time becomes so long that it may be equal to, or greater than, the predetermined time $T_U$.

Thus, a positive judgment may be made at Step S32 and the first estimated-value flag 1 may be set to one. Consequently the current estimated value CRES(n) is changed to zero at Step S24, and the control map B is selected at Step S2. If the anti-lock pressure control operation is carried out according to the control map B, the cut-off valve 30 is alternately opened and closed, so that the fluid is supplied from the master cylinder 10 to the front brake cylinder 16. Thus, the pressure in the brake cylinder 16 is increased appropriately. In addition, if the brake cylinder 16 is subject to the pressure reducing control, the fluid is discharged from the brake cylinder 16 and is supplied to the reservoir 44.

In the present embodiment, the current estimated reservoir fluid amount CRES(n) can be adjusted toward an actual value, though the accuracy of estimation of the value CRES(n) may not be improved. In addition, the pressure in the front brake cylinder 16 can be increased appropriately, and the delay of increasing of the pressure can be minimized. If the braking system is not provided with the present hydraulic pressure control apparatus in accordance with the present invention, the control map A is not changed to the control map B before a point of time $m_3'$.

Figure 9:
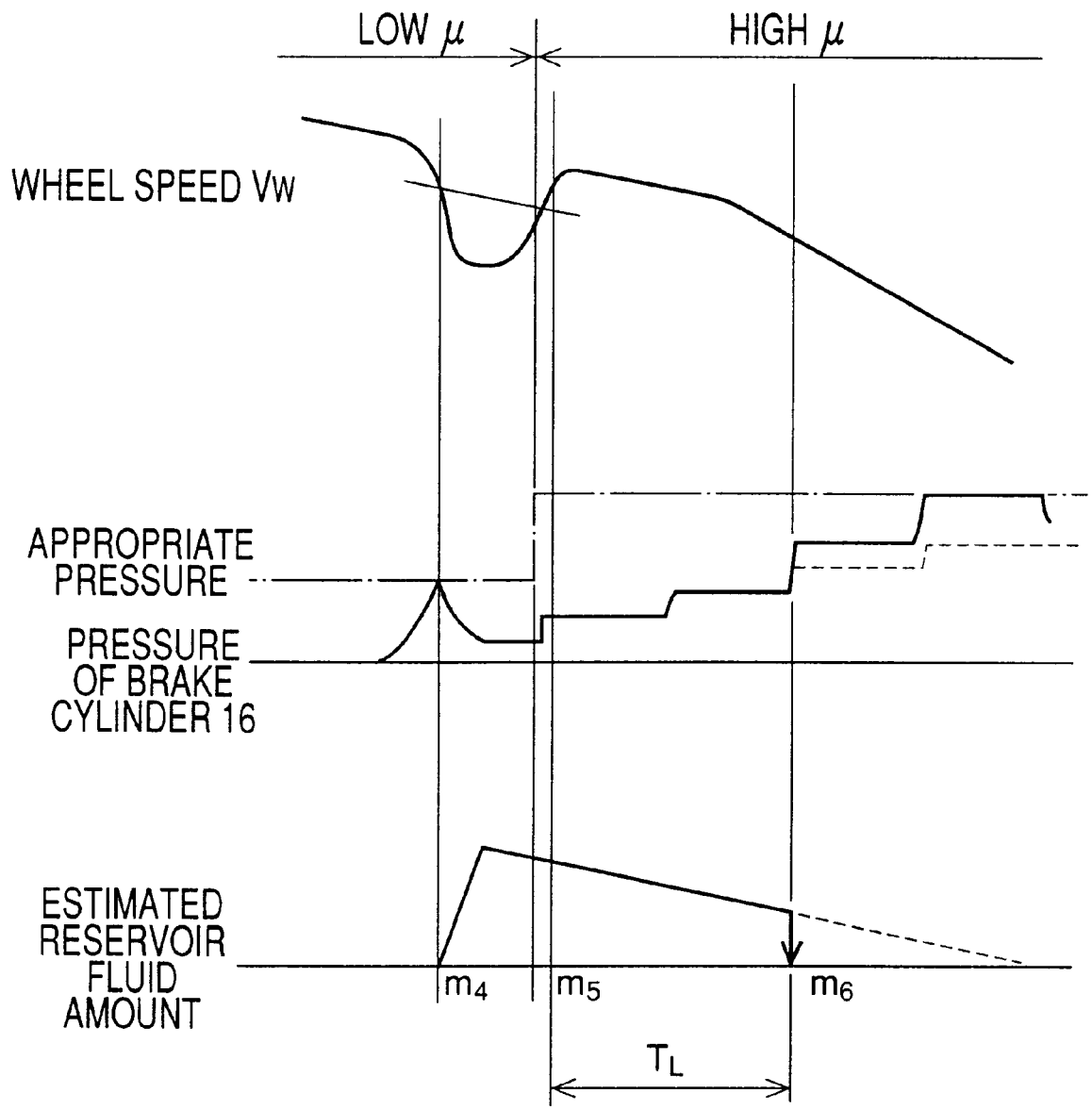
FIG. 9 is a graph showing another example of the same relationship when the control apparatus of FIG. 1 actually operates.

FIG. 9 shows the case where the vehicle runs on a road surface having first a low friction coefficient $\mu$ and then a high friction coefficient $\mu$. An anti-lock pressure control operation is started at a point of time $m_4$ when the vehicle is running on the road surface with the low friction coefficient $\mu$. Thus, the pressure-reduce mode is established for the front wheel 14. Then, the vehicle runs into the road surface with the high friction coefficient $\mu$, so that the pressure-increase or pressure slow-increase mode is established for the front wheel 14. At a point of time $m_5$, the slip ratio of the wheel 14 becomes lower than the predetermined value $S_L$. The pressure-increase control continues. However, since the delivery rate of the pump 38 is excessively low and accordingly no sufficiently high pressure-increase rate is obtained, the low-slip state of the front wheel 14 continues. At a point of time $m_6$, the low-slip-state time exceeds the predetermined time $T_L$. In this case, it is desirable to supply quickly the fluid to the front brake cylinder 16. Hence, the current estimated reservoir fluid amount is changed to zero.

Thus, a positive judgment is made at Step S31, and the first estimated-value flag 1 is set to one. Accordingly, the current estimated value CRES(n) is changed to zero, and the cut-off valve 30 is alternately opened and closed. If the cut-off valve 30 is thus compulsorily opened, the fluid is quickly supplied to the front brake cylinder 16. The cut-off valve 30 is provided primarily for being opened when the fluid of the reservoir 44 runs short during the anti-lock pressure control operation. However, also in the case where it is desirable to increase quickly the pressure in the brake cylinder 16, the cut-off valve 30 can be opened. Thus, the cut-off valve 30 can be opened for not only the primary purpose but also the secondary purpose, that is, can be used effectively. In addition, the pressure in the brake cylinder can be controlled at an appropriate value.

In this case, the estimated reservoir fluid amount value CRES(n) may not be different from the actual value. However, the estimated value CRES(n) is compulsorily changed to zero and the control map A is changed to the control map B, for the purpose of supplying quickly the fluid to the front brake cylinder 16.

If the estimated value CRES(n) is changed to zero though the estimated value may not be different from the actual value, the estimated value CRES(n+1) may be different from the actual value. Therefore, after the fluid is quickly supplied to the front brake cylinder 16, it is desirable that the estimated value CRES(n+m) be changed again to the estimated value CRES(n) which had been changed to zero. However, this is not essentially required for the following reasons: In the case where the vehicle runs into the road surface with the high friction coefficient $\mu$, it is highly likely that the anti-lock pressure control operation is finished. In this case, the estimated value CRES(n) which may be different from the actual value gives little influence to the anti-lock control. In addition, in the case where the continuous pressure-reduce time exceeds the predetermined value $T_D$ after the estimated value CRES(n) is changed to zero, the estimated value CRES(n) is changed to the capacity of the reservoir 44. In the latter case, the estimated value CRES(n) is adjusted toward the actual value.

Figure 10:
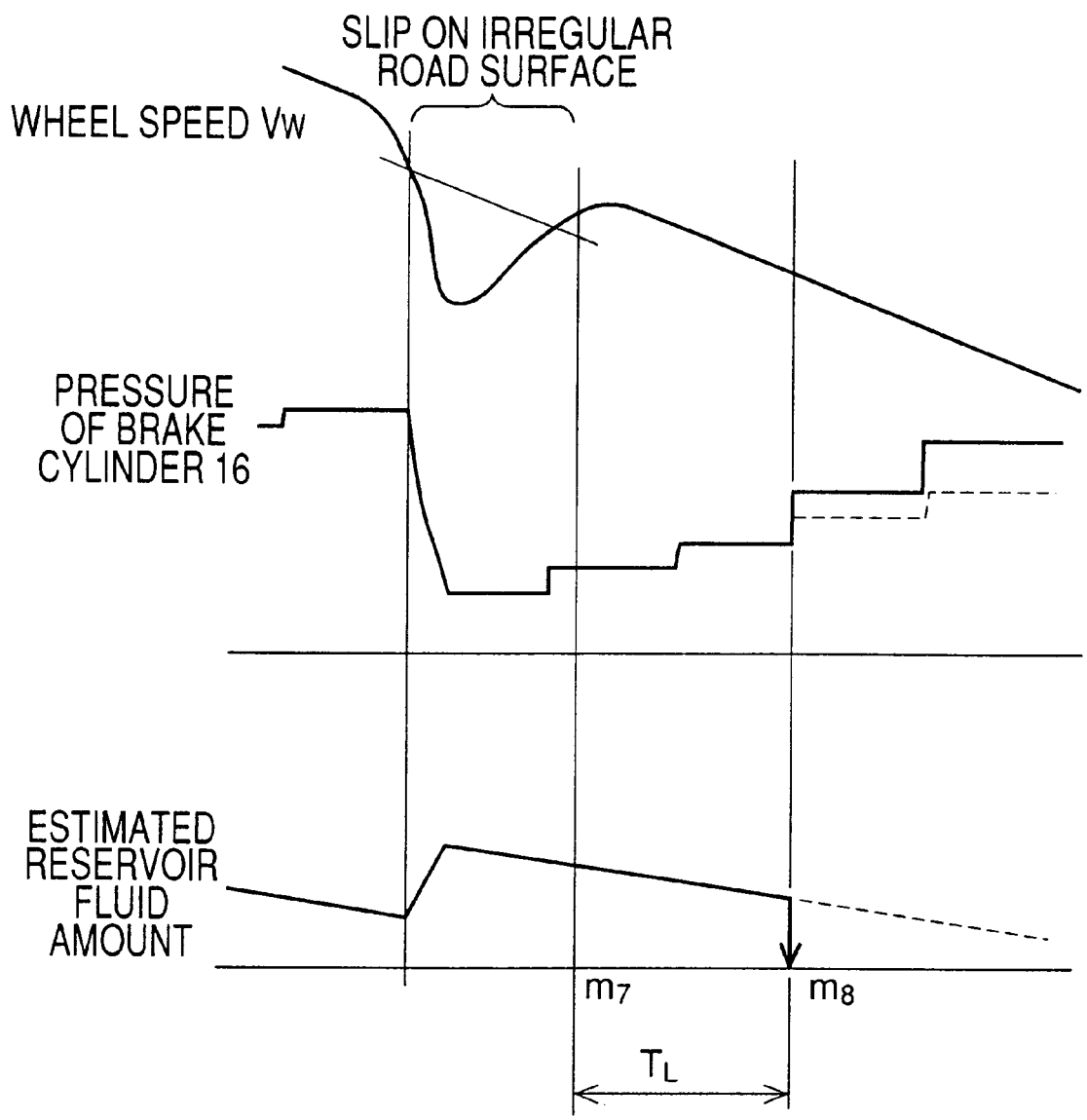
FIG. 10 is a graph showing yet another example of the same relationship when the control apparatus of FIG. 1 actually operates.

FIG. 10 shows the case where the vehicle runs on a road surface including a stepped area or a manhole having a low friction coefficient $\mu$. An anti-lock control operation is started when the vehicle runs through the stepped area or manhole with the low friction coefficient $\mu$. When the vehicle runs on an area having a high friction coefficient $\mu$ after the stepped area or the manhole, it is desirable to increase quickly the pressure in the brake cylinder 16. If, however, the delivery rate of the pump 38 is excessively low, it is impossible to do so. Thus, at a point of time $m_8$, the low-slip-state of the front wheel 14 continues for not less than the predetermined time $T_L$. Accordingly, the first estimated-value flag 1 is set to one and the cut-off valve 30 is alternately opened and closed.

In the present embodiment, the low slip ratio $S_L$ is determined at a value which cannot occur during a normal anti-lock control operation, that is, value greater than a slip ratio at which the pressure increase control is started. In addition, the reference time $T_L$ employed at Step S31 is shorter than the reference time $T_U$ employed at Step S32. Thus, in the case where an insufficient pressure increase occurs because the estimated reservoir fluid amount is greater than the actual value, the continuous pressure-increase-control time exceeds the reference time $T_U$; and in the case where the same problem occurs because the delivery rate of the pump 38 is insufficient, the low-slip-state time exceeds the reference time $T_L$. Since the reference time $T_L$ is shorter than the reference time $T_U$, the above problem can be effectively prevented from occurring because the delivery rate of the pump 38 is insufficient.

Meanwhile, if a positive judgment is made at Step S35 or S36, the second estimated-value flag 2 is set to one at Step S37. Then, the estimated reservoir fluid amount value CRES(n) is changed to the capacity value of the reservoir 44 at Step S25, and the maximum electric current is supplied to the motor 52 at Step S6. Thus, the fluid is quickly pumped up from the reservoir 44, and the fluid is efficiently discharged from the brake cylinder 16, so that the pressure in the brake cylinder 16 is efficiently reduced. The fluid pumped up by the pump 38 is returned to the master cylinder 10 via the by-pass return passage 32.

Moreover, in the case where an abnormality occurs to the electric circuit of the controller 70, the third estimated-value flag 3 is set to one at Step S64, and the estimated reservoir fluid amount value CRES(n) is changed to the average value of the reservoir fluid amount at Step S26. In this case, because neither of the continuous pressure-increase-control time and the continuous pressure-decrease-control time exceeds a corresponding one of the reference values $T_U$, $T_D$, it is more appropriate to change the estimated value CRES(n) to the average value than to zero or the capacity value. Even if the estimated value CRES(n) may be changed to the average value, the estimated value CRES(n) will be changed again to zero or the capacity value when the continuous pressure-increase-control time or the continuous pressure-decrease-control time exceeds the reference value $T_U$ or $T_D$. Thus, there arises no problem.

As is apparent from the foregoing description, the cut-off valve 30, the pressure increasing and reducing valve 40, the pressure reducing valve 46, etc. cooperate with one another to provide the pressure control device; a portion of the controller 70 which stores and executes the reservoir fluid amount estimating routine shown in FIG. 2 and the estimated reservoir fluid amount monitoring routines shown in FIGS. 3 and 4 provides the reservoir fluid amount estimating means; and a portion of the controller 70 which stores and executes Steps S11 and S22–S26 provides the estimated reservoir fluid amount changing means.

In the illustrated embodiment, the current estimated reservoir fluid amount value CRES(n) is changed to zero as a minimum value if the first estimated-value flag 1 is set to one; the current estimated value CRES(n) is changed to the capacity value of the reservoir 44 as a maximum value if the second estimated-value flag 2 is set to one; and the current estimated value CRES(n) is changed to the average value of the reservoir fluid amount as a highly possible value if the third estimated-value flag 3 is set to one. However, the current estimated value CRES(n) may be changed to other predetermined values than those employed in the illustrated embodiment. For example, the minimum value may be replaced by a very small value which is near to the minimum value but is greater than the same; and the maximum value may be replaced by a very great value which is near to the maximum value but is smaller than the same. In addition, in the case where the estimated-reservoir-fluid-amount-related value CD does not fall within a reference range, the current estimated value CRES(n) may be changed to half the capacity value of the reservoir 44, or alternately to a normally expected reservoir fluid amount value which is indicative of an amount of the fluid which is normally expected to be stored in the reservoir 44 at the time when the said current estimated value CRES(n) is obtained during an anti-lock pressure control operation on the assumption that the anti-lock control operation has normally been performed from the commencement thereof to that time.

In addition, in the illustrated embodiment, the control map A is replaced by the control map B if the current estimated reservoir fluid amount value CRES(n) is not greater than zero. However, it is possible that if the low-slip-state of the front wheel 14 continues for not less than the reference time $T_L$, the control map A be replaced by the control map B but the current estimated value CRES(n) be not changed to zero. In the latter case, the current estimated value CRES(n) is prevented from being deviated from the actual reservoir fluid amount value. Moreover, it is possible that under the same condition the cut-off valve 30 be opened for a predetermined time period but the control map A be not replaced by the control map B. Furthermore, it is possible that under the same condition not only the cut-off valve 30 be opened but also the pressure increasing and reducing valve 40 and the pressure reducing valve 46 be simultaneously opened. In the last case, the fluid is directly supplied to the reservoir 44.

In the illustrated embodiment, if the current estimated reservoir fluid amount value CRES(n) is not greater than zero as a lower limit value, the control map A is replaced by the control map B. However, the lower limit value is not limited to zero but may be selected at a reference value greater than zero. In this case, if the first estimated-value flag 1 is set to one, the current estimated value CRES(n) is changed to a predetermined value not greater than the lower limit reference value.

Figure 11:
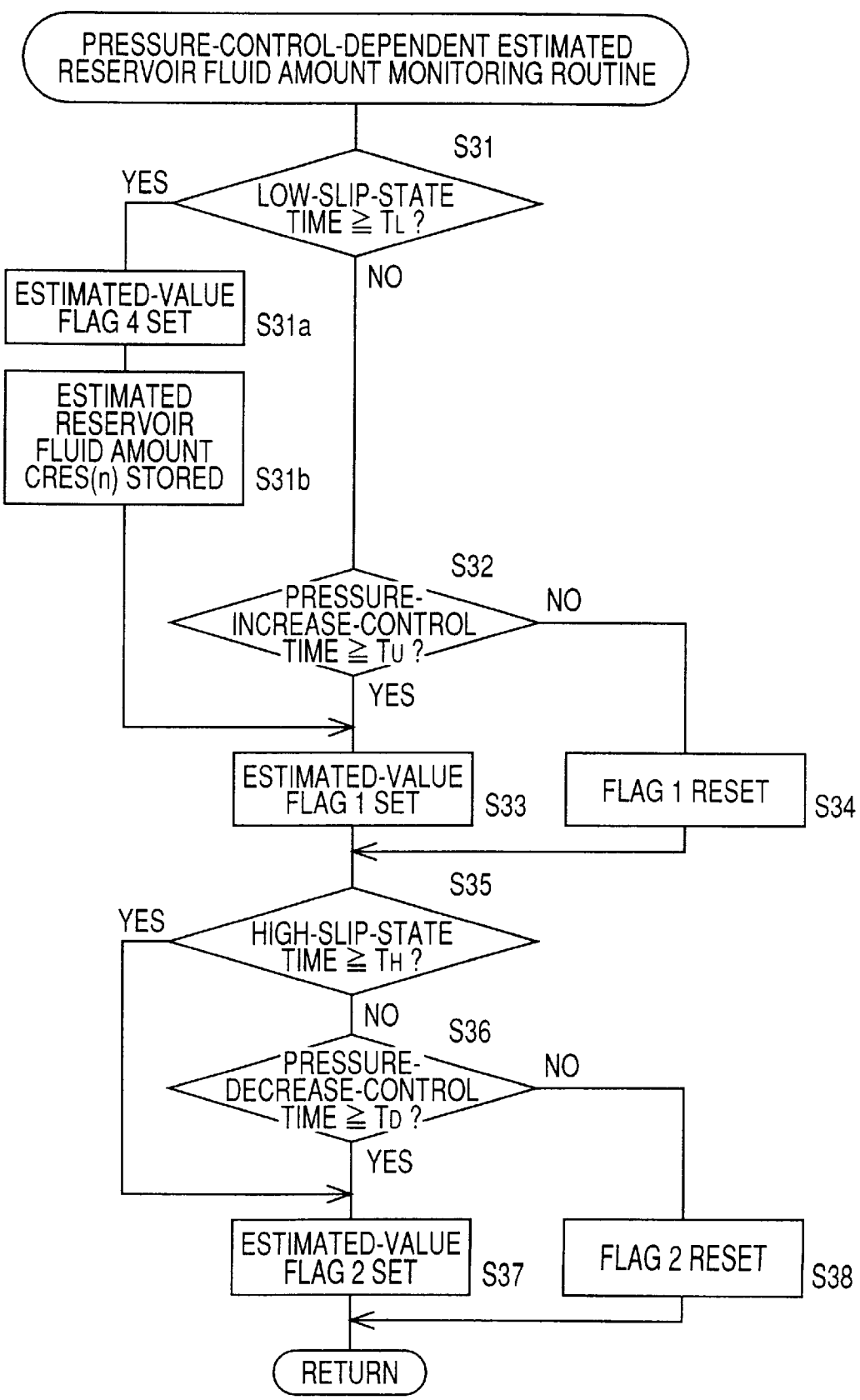
FIG. 11 is a flow chart representing a modified form of the pressure-control dependent estimated reservoir fluid amount monitoring routine shown in FIG. 3.
Figure 12:
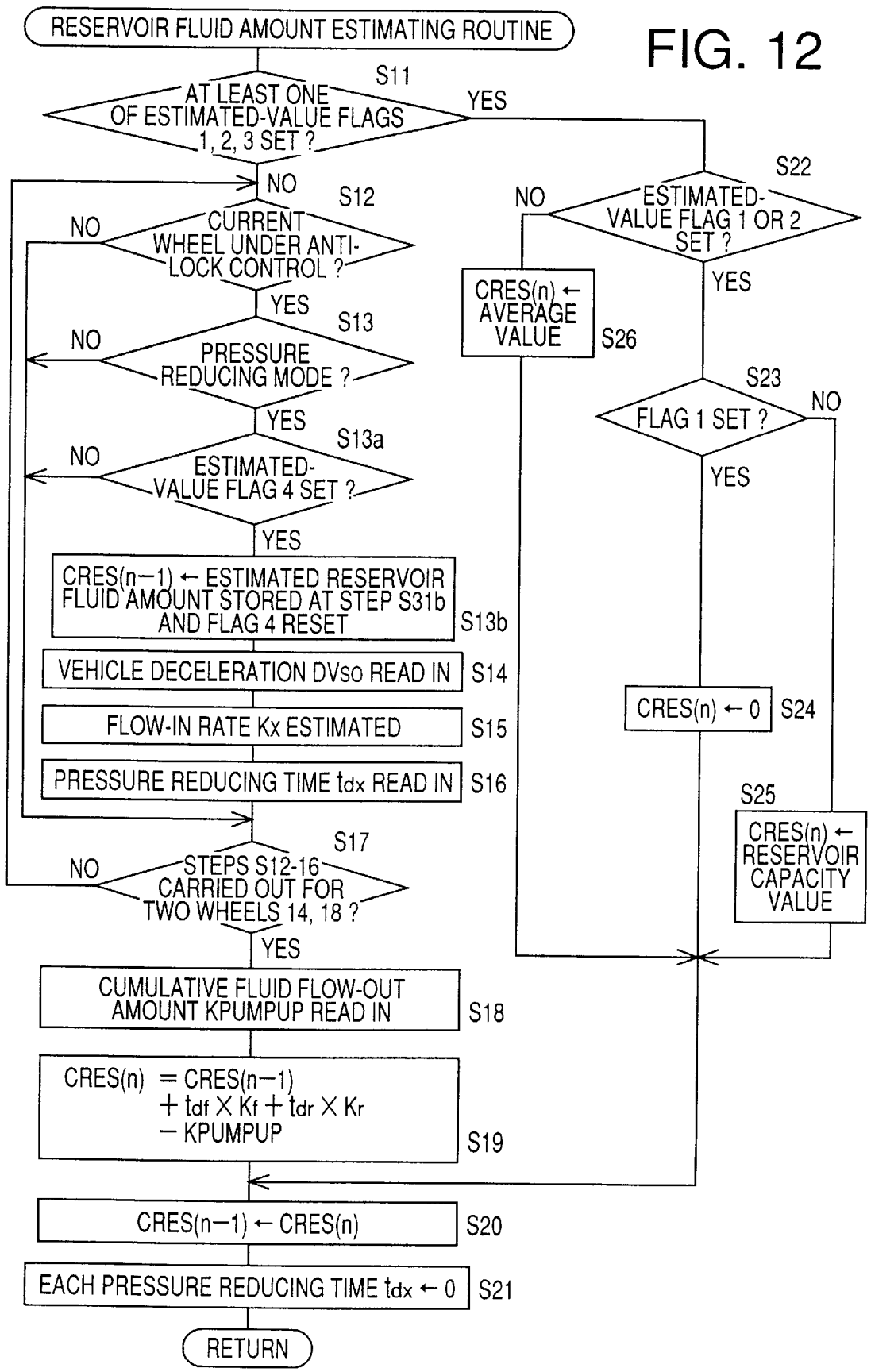
FIG. 12 is a flow chart representing a modified form of the reservoir fluid amount estimating routine shown in FIG. 2.

Moreover, in the case where the low-slip state of the front wheel 14 has continued for not less than the reference time $T_L$, it is possible that after the estimated reservoir fluid amount value CRES(n) has been changed to zero at that time, the current estimated value CRES(n+m) which is obtained based on zero be changed again to the estimated value which had been changed to zero. In this case, if a positive judgment is made at Step S31, the control of the CPU goes to Steps S31a and S31b as illustrated in the flow chart of FIG. 11. At Step S31a, a fourth estimated-value flag 4 is set to one and, at Step S31a, the current estimated value CRES(n) is stored in the RAM of the controller 70. Then, at Step S33, the first flag 1 is set to one. Thus, both of the first and fourth flags 1, 4 are set. Since the first flag 1 is set, the estimated value CRES(n) is changed to zero at Step S24, and the control map A is replaced by the control map B at Step S3. Thereafter, when the pressure reducing mode is first established, that is, if a positive judgment is made at Step S13, the control of the CPU goes to Steps S13a and S13b as illustrated in the flow chart of FIG. 12. At Step S13a, the CPU judges whether the fourth flag 4 is set. In this case, a positive judgment is made at Step S13a, and the control goes to Step S13b to change the preceding estimated value CRES(n−1) to the estimated value stored at Step S31b. If the current estimated value CRES(n) is returned to the estimated value stored at Step S31b immediately after the control map A is replaced by the control map B, the control map B is replaced by the control map A, so that the pressure in the front brake cylinder 16 cannot be increased sufficiently. In addition, whether the low-slip state of the front wheel 14 continues for not less than the reference time $T_L$ is judged during the pressure-increase control operation, and it is desirable that the pressure-increase control operation be performed according to the control map B.

The reference slip ratio value $S_L$ and the reference time values $T_L$, $T_U$ may not subject to the conditions employed in the illustrated embodiments. For example, the reference value $S_L$ may be selected at a value equal to the value where the normal pressure increase control is started and the reference values $T_L$, $T_U$ may be selected at respective values equal to each other. In the latter case, which one of Steps S31 and S32 provides a positive judgment during the pressure increase control operation, cannot be predicated in advance.

In the illustrated embodiment, the estimated reservoir fluid amount CRES(n) is obtained based on the vehicle deceleration $DV_{SO}$, the pressure reducing time $t_{dx}$, and the pumping-up time. However, the estimated reservoir fluid amount CRES(n) may be obtained by additionally taking into account the amount of overshooting of the pressure in the brake cylinder 16, 20 when the current pressure-reduce control is started, and/or the time of increasing of the pressure in the brake cylinder 16, 20 before the current pressure-reduce control is started.

In the present embodiment, the volume of the rear brake cylinder 20 is significantly smaller than that of the front brake cylinder 16 and, when the pressure reducing mode is established for the front brake cylinder 16, the rear brake cylinder 20 is also subjected to the pressure reducing mode. Therefore, the flow-in rate $K_x$ may be estimated based on only the pressure reducing time measured for the front brake cylinder 16, without taking into account the pressure reducing time measured for the rear brake cylinder 20. In this case, as can be understood from the flow-in rate selecting map shown in FIG. 7, the flow-in rate $K_x$ may be selected based on the vehicle deceleration $DV_{SO}$ only, and the flow-rate determining flag may be omitted. Moreover, it is possible to estimate the flow-in rate $K_x$ based on not only the pressure reducing time measured for the front and/or rear brake cylinder 16, 20 but also the pressure increasing time measured for the same.

U.S. patent application Ser. No. 08/627,962, assigned to the Assignee of the present application, discloses the art of estimating the cumulative fluid flow-in amount based on only the pressure reducing time measured for the front brake cylinder 16, and the art of estimating the reservoir fluid amount by additionally taking into account the amount of overshooting of the pressure in the brake cylinder 16, 20 when the current pressure-reduce control is started, and/or the time of increasing of the pressure in the brake cylinder 16, 20 before the current pressure-reduce control is started.

In the illustrated embodiment, the positive or negative judgment at Step S13 of the reservoir fluid amount estimating routine shown in FIG. 2 is made depending upon the current pressure control mode (i.e., pressure increasing, reducing, or holding mode). However, this judgment may be made depending upon the current shut-off-valves control mode (i.e., first to seventh modes shown in TABLE 1). In the illustrated embodiment, the alternate establishment of the fifth and seventh modes or the alternate establishment of the fourth and seventh modes is regarded as the pressure holding mode. Accordingly, the time period during which the seventh mode is established in those cases is not counted as a pressure reducing time. In the case where the above judgment is made depending upon the current shut-off-valves control mode, the above time period is counted as part of the total pressure reducing time. Accordingly, the accuracy of estimation of the cumulative fluid flow-in amount is improved as such.

The control maps A, B indicated in TABLE 2 and TABLE 3 may be modified. For example, in the case where both the respective slipping tendencies of the front and rear wheels 14, 18 are decreasing, the fifth and seventh modes, or the fourth and seventh modes, may be alternately established; and in the case where the slipping tendency of the front wheel 14 is decreasing and that of the rear wheel 18 is increasing, the sixth and seventh modes may be alternately established.

While the hydraulic pressure control apparatus described above takes the form of the braking system having the specific arrangement according to the above embodiment of this invention, the principle of the invention is equally applicable to other types of braking system. For instance, the pressure increasing and reducing valve 46 and the pressure reducing valve 46 may be replaced by a single 3-position directional control valve. The pressure reducing valve device 60 and the P valve 36 are not essential to practice the present invention.

The principle of this invention is also applicable to a hydraulic pressure control apparatus in a braking system having two pressure application sub-systems, one for the front right and left wheels, and the other for the rear right and left wheels. In this second embodiment, the hydraulic control device takes the form of the pressure application sub-system which includes two brake cylinders for the front right and left wheels. In this pressure control apparatus or pressure application sub-system, one reservoir and one pump are provided for the two brake cylinders for the front right and left wheels. Unlike the first embodiment, however, the present second embodiment is capable of performing anti-lock pressure control operations for the right and left wheels (two front wheels) independently of each other.

Figure 13:
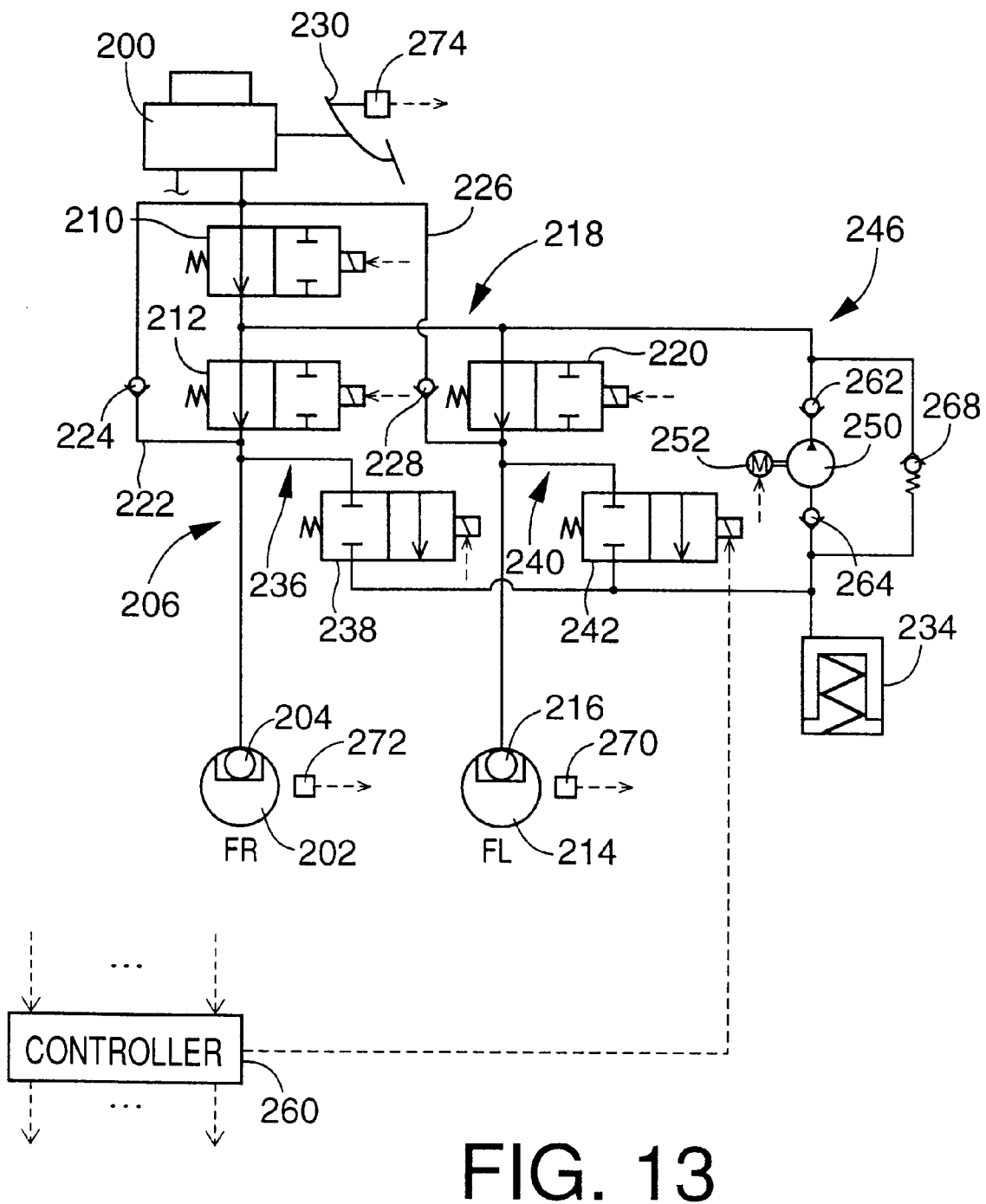
FIG. 13 is a schematic view corresponding to FIG. 1, illustrating another anti-lock braking system including another hydraulic pressure control apparatus constructed according to another embodiment of this invention.

In FIG. 13, reference numeral 200 denotes a master cylinder 200. In a primary fluid passage 206 connecting the master cylinder 200 and a brake cylinder 204 for a front right wheel 202, there are provided a solenoid-operated cut-off valve 210 and a solenoid-operated pressure increasing valve 212. To a portion of the primary fluid passage 206 between the cut-off valve 210 and the pressure increasing valve 212, there is connected a secondary fluid passage 218 which is connected at one end thereof to a brake cylinder 216 for a front left wheel 214. A solenoid-operated pressure increasing valve 220 is provided in the secondary fluid passage 218.

The primary fluid passage 206 is provided with a by-pass passage 222 which by-passes the cut-off valve 210 and pressure increasing valve 212. A check valve 224 is provided in the by-pass passage 222. This check valve 224 permits a flow of the fluid in a direction from the wheel brake cylinder 204 toward the master cylinder 200, but inhibits a flow of the fluid in the reverse direction. There is provided another by-pass passage 226 connecting the primary and secondary fluid passages 206, 218 and by-passing the cut-off and pressure increasing valves 210, 220. In this by-pass passage 226, there is provided a check valve 228.

The front right wheel brake cylinder 204 and the reservoir 234 are connected by a pressure reducing passage 236. A pressure reducing valve 238 is provided in the pressure reducing passage 236. Similarly, the front left wheel brake cylinder 216 and the reservoir 234 are connected by a pressure reducing passage 240 in which is provided a pressure reducing valve 242.

A pressure increasing passage 246 is connected at one end thereof to the reservoir 234. A pump 250 is provided in the pressure increasing passage 246. The pump 250 is operated by an electric motor 252, which is controlled by a controller 260 through a driver circuit (not shown). As in the first embodiment, the electric current supplied to the motor 250 is normally held constant with the duty ratio being held at a predetermined value smaller than one and, when the estimated reservoir fluid amount value is not smaller than the capacity value of the reservoir 234, the electric current is supplied to the motor 250 at the maximum duty ratio, i.e., one.

Two check valves 262, 264 are provided in the pressure increasing passage 246. The check valve 262 is located on the delivery side of the pump 250, while the check valve 264 is located on the suction side of the pump 250. A pressure relief valve 268 is provided in a passage which by-passes the pump 250. This pressure relief valve 268 permits a flow of the fluid in a direction from the delivery port of the pump 250 toward the suction port, when the pressure difference on the delivery and suction sides of the pump 250 exceeds a predetermined value. The pressure in the reservoir 234 is close to the atmospheric pressure and is held substantially constant. Therefore, the fluid delivered from the pump 250 is returned to the reservoir 234 through the pressure relief valve 268 when the delivery pressure of the pump 250 exceeds the predetermined value.

The controller 260 is principally constituted by a computer incorporating a central processing unit (CPU), a read-only memory (ROM), a random-access memory (RAM), an input interface and an output interface. To the input interface, there are connected wheel speed sensors 270, 272 for detecting the rotating speeds of the front right and left wheels 202, 214, wheel speed sensors (not shown) for detecting the rotating speeds of the rear right and left wheels, and a brake switch 274 for detecting an operation of the brake pedal 230. To the output interface of the controller 260, there are connected through respective drivers the motor 252 and the solenoid coils of the cut-off valve 210, pressure increasing valves 212, 220 and pressure reducing valves 238, 242. The ROM stores various control programs such as those for executing an anti-lock pressure control routine, a control map selecting routine and a reservoir fluid amount estimating routine, and also stores various data maps such as control maps A and B of TABLES 4 and 5.

During a normal braking operation, the cut-off valve 210, pressure increasing valves 212, 220, and pressure reducing valves 238, 242 are placed in the positions shown in FIG. 13. In this condition, the fluid pressurized by the master cylinder 200 depending upon the operating amount of the brake pedal 230 is supplied to the wheel brake cylinders 204, 216. When the depressed brake pedal 230 is released, the fluid is discharged from the wheel brake cylinders 204, 216 and returned to the master cylinder 200, through the by-pass passages 222, 226, or through the pressure increasing valve 212 and cut-off valve 210, and the pressure increasing valve 220 and cut-off valve 210, which are all placed in the open state.

When the slipping tendency of at least one of the front right and left wheel 202, 214 becomes excessive, an anti-lock pressure control operation is initiated. Throughout this pressure control operation, the motor 252 is held on, and the cut-off valve 210 is held closed. Normally, the anti-lock pressure control operation is performed according to the control map A of TABLE 4. However, the control map A is switched to the control map B of TABLE 5 when the reservoir fluid amount estimated according to a suitable routine becomes not greater than a predetermined lower limit, i.e., zero.

TABLE 4

CONTROL MAP A

|  | Cut-off Valve 210 | Pressure Increasing Valve 212 | Pressure Reducing Valve 238 |
| --- | --- | --- | --- |
| Pressure Reducing Mode | Closed | Closed | Open |
| Pressure Holding Mode | Closed | Closed | Closed |
| Pressure Increasing Mode | Closed | Open | Closed |

TABLE 5

CONTROL MAP B

|  | Cut-off Valve 210 | Pressure Increasing Valve 212 | Pressure Reducing Valve 238 |
| --- | --- | --- | --- |
| Pressure Reducing Mode | Closed | Closed | Open |
| Pressure Holding Mode | Closed | Closed | Closed |
| Pressure Increasing Mode | Alternate Closed/Open | Open | Closed |

There will be described an anti-lock pressure control operation for the front right wheel 202 (for the wheel brake cylinder 204), by way of example. An anti-lock pressure control operation for the front left wheel 214 (for the wheel brake cylinder 216) is the same as that for the front right wheel 202.

When the pressure reducing mode is established for the wheel brake cylinder 204 during an anti-lock pressure control operation according to the control map A, the pressure increasing valve 212 is closed while the pressure reducing valve 238 is opened. As a result, the wheel brake cylinder 204 is disconnected from the pump 250 and connected to the reservoir 234, so that the fluid is discharged from the wheel brake cylinder 204 into the reservoir 234, whereby the pressure in the wheel brake cylinder 204 is reduced.

When the pressure holding mode is established, the pressure increasing and reducing valves 212, 238 are both closed, so that the wheel brake cylinder 204 is disconnected from both the reservoir 234 and the pump 250, and the pressure in the wheel brake cylinder 204 is maintained.

When the pressure increasing mode is established, the pressure increasing valve 212 is opened while the pressure reducing valve 238 is closed, so that the wheel brake cylinder 204 is disconnected from the reservoir 234 and communicated with the pump 250. As a result, the pressurized fluid is delivered from the pump 250 to the wheel brake cylinder 204, and the pressure in this cylinder 204 is increased.

The control map is switched from the control map A to the control map B if the reservoir fluid amount estimated according to the estimating routine is reduced below the predetermined lower limit during the anti-lock pressure control operation according to the control map A.

The control map B is different from the control map A, when the pressure increasing mode is established. According to the control map B in TABLE 5, the cut-off 210 is alternately opened and closed when the pressure increasing mode is established. In this mode, the pressure in the wheel brake cylinder 204 is increased primarily by the pressurized fluid supplied from the master cylinder 200.

In the present second embodiment wherein the anti-lock pressure control operations can be performed for the front right and left wheels 202, 214, independently of each other, the reservoir fluid amount estimating routine similar to that of FIG. 2 is executed for the front right and left wheel brake cylinders 204, 216, independently of each other. That is, the pressure reducing control is never performed for a rear wheel as a result of performance of the pressure reducing control for the front wheel 202, 204, unlike the first embodiment. Thus, the flow-rate determining flag utilized at Step S15 in the first embodiment may be omitted. Since the two front brake cylinders 204, 216 do not share a single pressure reducing shut-off valve like the pressure reducing shut-off valve 60 employed in the first embodiment, the present braking system does not need different groups of flow-in rate values $K_x$ for the first case where the pressure reducing mode is established for only one of the two front wheels 202, 214 and the second case where the pressure reducing mode is established for both of the two front wheels 202, 214, respectively. In addition, since the respective volumes of the front brake cylinders 204, 216 are substantially equal to each other, the flow-in rate values $K_{fr}$ for the front right wheel 202 may be substantially equal to the flow-in rate values $K_{fl}$ for the front left wheel 214.

Usually, the anti-lock pressure control operations are initiated simultaneously for the front right and left wheels 202, 214, or with a short time delay between the two operations. However, the anti-lock pressure control operation may be performed for only one of the two front wheels 202, 214, while the vehicle is running on an uneven friction-coefficient road surface.

If, for example, the anti-lock pressure control operation is performed for the front right wheel 202 while it is not performed for the front left wheel 214, it could be said that the pressure increasing mode is established for the front left wheel brake cylinder 216 for which the anti-lock pressure control operation is not performed. That is, the pressure increasing valve 220 is held open while the pressure reducing valve 242 is held closed, so that the fluid pumped up from the reservoir 234 by the pump 250 is always supplied to the wheel brake cylinder 216, without the fluid being discharged from this wheel brake cylinder 216. Thus, the cumulative fluid flow-out amount will be greater than the cumulative fluid flow-in amount. Therefore, the estimated reservoir fluid amount CRES(n) is likely to be not greater than zero as the predetermined lower limit. That is, the control map B is likely to be selected.

When the control map B is selected, however, the fluid pressurized by the master cylinder 200 is supplied to the wheel brake cylinder 216, there arises no shortage of the pressurized fluid to increase the pressure in the wheel brake cylinder 216.

Even if the pressurized fluid runs short because the estimated reservoir fluid amount value is greater than the actual value, the first estimated-value flag 1 is set if the continuous pressure-increase control time exceeds the reference time $T_U$, and the control map B is selected in place of the control map A. Thus, the delay of increasing of the pressure is minimized. In addition, the estimated reservoir fluid amount value is adjusted to a value nearer to the actual value.

If the continuous pressure-reduce control time exceeds the reference time $T_D$, the second estimated-value flag 2 is set so that the delivery rate of the pump 250 is maximized, and the cut-off valve 210 is opened. Thus, the fluid is quickly pumped up by the pump 250 from the reservoir 234, and is returned to the master cylinder 200 through the cut-off valve 210 being opened. The above condition is satisfied during the pressure-reduce control in which the pressure increasing valves 212, 220 are held closed. Therefore, there arises no problem even if the cut-off valve 210 is held opened.

In the present second braking system wherein one reservoir 234 and one pump 232 are provided for the two front brake cylinders 204, 216, the reservoir fluid amount can be estimated with high accuracy, like the braking system in accordance with the first embodiment.

While the present invention has been described above in its presently preferred embodiments, for illustrative purpose only, it is to be understood that the present invention is not limited to the details of the illustrated embodiments and the specific changes and modifications indicated above, and that the invention may be embodied with various other changes, modifications and improvements, which may occur to those skilled in the art, without departing from the scope of the invention defined in the following claims.

What is claimed is:

1. A hydraulic pressure control aparatus for a brake including a brake cylinder activated by a pressurized fluid for braking a wheel of a vehicle, a reservoir for storing the fluid discharged from the brake cylinder, and a pump for pumping up the fluid from the reservoir, the apparatus comprising:

a pressure control device which discharges the fluid from the brake cylinder, into the reservoir, to reduce a pressure of the fluid in the brake cylinder, and supplies the fluid pumped up from the reservoir, to the brake cylinder, to increase the pressure of the fluid in the brake cylinder;

reservoir fluid amount estimating means for estimating a cumulative amount of flow of the fluid from the brake cylinder into the reservoir and a cumulative amount of flow of the fluid out of the reservoir, and estimating an amount of the fluid stored in the reservoir on the basis of the estimated cumulative amount of flow of the fluid into the reservoir and the estimated cumulative amount of flow of the fluid out of the reservoir; and estimated fluid amount changing means for changing the estimated reservoir fluid amount provided by said reservoir fluid amount estimating means, to a predetermined value, when an operating state of the hydraulic pressure control apparatus satisfies a predetermined condition during an operation of said pressure control device to control the pressure of the fluid in the brake cylinder.

2. The hydraulic pressure control apparatus according to claim 1, wherein said estimated fluid amount changing means comprises pressure-control dependent changing means for changing said estimated reservoir fluid amount to said predetermined value when an operating state of said pressure control device to control the pressure of the fluid in the brake cylinder satisfies said predetermined condition.

3. The hydraulic pressure control apparatus according to claim 1, wherein said estimated fluid amount changing means comprises means for changing said estimated reservoir fluid amount to a minimum value as said predetermined value, when said operating state of the hydraulic pressure control apparatus satisfies said predetermined condition that said pressure control device has continuously operated to increase the pressure of the fluid in the brake cylinder for not less than a reference time.

4. The hydraulic pressure control apparatus according to claim 1, wherein said estimated fluid amount changing means comprises means for changing said estimated reservoir fluid amount to a maximum value as said predetermined value, when said operating state of the hydraulic pressure control apparatus satisfies said predetermined condition comprising at least one of a first condition that said pressure control device has continuously operated to reduce the pressure of the fluid in the brake cylinder for not less than a first reference time and a second condition that a slipping state of the wheel in which a slip of the wheel is higher than a reference value has continued for not less than a second reference time.

5. The hydraulic pressure control apparatus according to claim 4, wherein the brake further includes an electric motor which drives the pump, wherein the hydraulic pressure control apparatus further comprises a motor output control device which controls an output of the electric motor, and wherein said motor output control device comprises means for maximizing the output of the electric motor when said reservoir fluid amount estimating means provides said maximum value as said estimated reservoir fluid amount.

6. The hydraulic pressure control apparatus according to claim 1, wherein said estimated fluid amount changing means comprises fluid-amount-estimation dependent changing means for changing said estimated reservoir fluid amount to said predetermined value when an operating state of said reservoir fluid amount estimating means to estimate aid amount of the fluid stored in the reservoir satisfies said predetermined condition.

7. The hydraulic pressure control apparatus according to claim 1, wherein said estimated fluid amount changing means comprises means for changing said estimated reservoir fluid amount to said predetermined value when said operating state of the hydraulic pressure control apparatus satisfies said predetermined condition that an estimated-reservoir-fluid-amount relating value which relates to said estimated reservoir fluid amount does not fall within a reference range.

8. The hydraulic pressure control apparatus according to claim 1, further comprising a fluid supplying device which supplies the fluid to the reservoir; and a fluid-supplying-device control device which controls said fluid supplying device to supply the fluid to the reservoir when said estimated reservoir fluid amount is not greater than a lower limit value.

9. The hydraulic pressure control apparatus according to claim 1, wherein the brake includes a master cylinder and a fluid passage which communicates at on end thereof with the master cylinder and at the other end thereof with the brake cylinder, wherein said pressure control device comprises a connecting and disconnecting device which is provided midway in the fluid passage and which is selectively placed in a connecting state in which said connecting and disconnecting device connects the master cylinder and the brake cylinder and a disconnecting state in which the connecting and disconnecting device disconnects the master cylinder and the brake cylinder from each other; and a connecting-and-disconnecting-device control device which controls said connecting and disconnecting device to be placed from said disconnecting state thereof to said connecting state thereof when said estimated reservoir fluid amount is not greater than a lower limit value, and wherein said estimated fluid amount changing means comprises means for changing said estimated reservoir fluid amount to said predetermined value not grater than said lower limit value, when said operating state of the hydraulic pressure control apparatus satisfies said predetermined condition that after said operation of said pressure control device has started, a slipping state of the wheel in which a slip of the wheel is smaller than a reference value has continued for not less than a reference time.

10. The hydraulic pressure control apparatus according to claim 1, wherein the brake includes a master cylinder and a fluid passage which communicates at one end thereof with the master cylinder and at the other end thereof with the brake cylinder, wherein said pressure control device comprises a connecting and disconnecting device which is provided midway in the fluid passage and which is selectively placed in a connecting state in which said connecting and disconnecting device connects the master cylinder and the brake cylinder and a disconnecting state in which the connecting and disconnecting device disconnects the master cylinder and the brake cylinder from each other; and a connecting-and-disconnecting-device control device which controls said connecting and disconnecting device to be placed from said disconnecting cite thereof to said connecting state thereof when said estimated reservoir fluid amount is not greater than a lower limit value, wherein the hydraulic pressure control apparatus further comprises a road-surface friction coefficient obtaining device which obtains, during an operation of said pressure control device, a friction coefficient, $\mu$, of a road surface on which the vehicle is running, and wherein said estimated fluid amount changing means comprises means for changing said estimated reservoir fluid amount to said predetermined value not greater than said lower limit value, when said operating state of the hydraulic pressure control apparatus satisfies said predetermined condition that the road-surface friction coefficient $\mu$ obtained by said road-surface friction coefficient obtaining device has increased by not less than a reference value.

11. The hydraulic pressure control apparatus according to claim 1, wherein the brake includes a master cylinder and a reservoir fluid passage which communicates at one end thereof with the master cylinder and at the other end thereof with the reservoir, wherein the hydraulic pressure control apparatus further comprises a connecting and disconnecting device which is provided midway in the reservoir fluid passage and which is selectively placed in a connecting state in which said connecting and disconnecting device connects the master cylinder and the reservoir and a disconnecting state in which the connecting and disconnecting device disconnects the master cylinder and the reservoir from each other; and a connecting-and-disconnecting-device control device which controls said connecting and disconnecting device which controls said connecting and disconnecting device to be placed from said disconnecting state thereof to said connecting state thereof when said estimated reservoir fluid amount is not greater than a lower limit value.

12. The hydraulic pressure control apparatus according to claim 1, wherein said pressure control device comprises a pressure reducing control device which reduces the pressure of the fluid in the brake cylinder by discharging the fluid from the brake cylinder, and a pressure increasing control device which increases the pressure of eh fluid in the brake cylinder by supplying the fluid pumped up from the reservoir, to the brake cylinder.

13. The hydraulic pressure control apparatus according to claim 1, wherein said pressure control device comprises at least on of an anti-lock pressure control device which controls the pressure of the fluid in the brake cylinder such that a slipping state of the wheel on a road surface upon the activation of the brake cylinder is maintained at a first optimum state, and a traction pressure control device which controls the pressure of the fluid in the brake cylinder such that a slipping state of the wheel being driven on a road surface is maintained at a second optimum value.

14. The hydraulic pressure control apparatus according to claim 1, wherein said reservoir fluid amount estimating means comprises flow-in amount estimating means for estimating said cumulative amount of flow of the fluid into the reservoir on the basis of a pressure reducing time during which the pressure of the fluid in the brake cylinder is reduced by said pressure control device, and flow-out amount estimating means for estimating said cumulative amount of flow of the fluid out of the reservoir on the basis of a pumping time during which the pump pumps up the fluid from the reservoir.

15. The hydraulic pressure control apparatus according to claim 14, further comprising a deceleration obtaining device which obtains a deceleration of the vehicle on which the hydraulic pressure control apparatus is mounted, wherein said reservoir fluid amount estimating means comprises deceleration dependent estimating means for estimating the amount of the fluid stored in the reservoir on the basis of the vehicle deceleration obtained by said deceleration obtaining device.

* * * * *